United States Patent
Hasegawa et al.

(10) Patent No.: US 12,547,611 B2
(45) Date of Patent: Feb. 10, 2026

(54) CONTROL METHOD, AND ADAPTER

(71) Applicant: Hitachi, Ltd., Tokyo (JP)

(72) Inventors: Toshiyuki Hasegawa, Tokyo (JP); Nobuyuki Yamamoto, Tokyo (JP)

(73) Assignee: HITACHI, LTD., Tokyo (JP)

( * ) Notice: Subject to any disclaimer, the term of this patent is extended or adjusted under 35 U.S.C. 154(b) by 9 days.

(21) Appl. No.: 18/465,232

(22) Filed: Sep. 12, 2023

(65) Prior Publication Data
US 2024/0126747 A1    Apr. 18, 2024

(30) Foreign Application Priority Data
Oct. 18, 2022    (JP) .................................. 2022-166952

(51) Int. Cl.
*G06F 16/23* (2019.01)
*G06F 16/2458* (2019.01)

(52) U.S. Cl.
CPC ...... *G06F 16/2379* (2019.01); *G06F 16/2343* (2019.01); *G06F 16/2471* (2019.01)

(58) Field of Classification Search
CPC ............. G06F 16/2379; G06F 16/2343; G06F 16/2471
USPC ........................................................ 707/703
See application file for complete search history.

(56) References Cited

U.S. PATENT DOCUMENTS

| | | | | |
|---|---|---|---|---|
| 5,261,089 A * | 11/1993 | Coleman | ................. | G06F 9/466 |
| 6,895,529 B2 * | 5/2005 | Egolf | ................. | G06F 11/1474 |
| | | | | 714/21 |
| 7,290,056 B1 * | 10/2007 | Mclaughlin, Jr. | ... | H04L 43/0852 |
| | | | | 709/201 |
| 10,157,108 B2 * | 12/2018 | Guerin | ................. | G06F 17/40 |
| 10,250,693 B2 * | 4/2019 | Colrain | ................. | H04L 67/142 |
| 11,080,271 B2 * | 8/2021 | Lee | ................. | G06F 16/2365 |
| 11,822,540 B2 * | 11/2023 | Li | ................. | G06F 16/27 |

(Continued)

FOREIGN PATENT DOCUMENTS

WO    2013/138770 A1    9/2013

OTHER PUBLICATIONS

Huang, Dongxu, et al., "TiDB: A Raft-based HTAP Database", Proc. of the VLDB Endowment, vol. 13, No. 12, Aug. 1, 2020, pp. 3072-3084.*

(Continued)

*Primary Examiner* — Robert Stevens
(74) *Attorney, Agent, or Firm* — Volpe Koenig

(57) ABSTRACT

A data store comprises a commit management map including an identifier of a distributed transaction. A control method executed by an adapter coupled to the data store includes: alternate processing of, temporarily storing the reception query, and causing a transaction on the data store side to execute the reception query; perpetuation processing of determining whether or not commit is possible using lock information and perpetuating the GXID to be committed and the temporarily stored reception query in a case where commit is possible; settlement processing of causing the transaction on the data store side to execute a GXID addition query that is a query that adds the GXID to be committed to the commit management map and committing the transaction on the data store side; and store restart processing of the adapter starting a new transaction at the data store for a distributed transaction in an in-doubt state.

12 Claims, 31 Drawing Sheets

(56) References Cited

U.S. PATENT DOCUMENTS

| | | | | |
|---|---|---|---|---|
| 2005/0144299 A1* | 6/2005 | Blevins | ............... | G06F 16/284 709/230 |
| 2010/0191884 A1* | 7/2010 | Holenstein | .......... | G06F 16/2343 707/613 |
| 2013/0036136 A1* | 2/2013 | Horii | ................... | G06F 16/2308 707/E17.014 |
| 2016/0125018 A1* | 5/2016 | Tomoda | .............. | G06F 16/1805 707/703 |
| 2018/0349418 A1* | 12/2018 | Lee | ........................ | G06F 16/27 |
| 2024/0070143 A1* | 2/2024 | Cruanes | .............. | G06F 16/2379 |

OTHER PUBLICATIONS

Dragojević, Aleksandar, et al., "No compromises: distributed transactions with consistency, availability, and performance", SOSP '15, Monterey, CA, Oct. 4-7, 2015, pp. 54-70.*

Waqas, Ahmad, et al., "Transaction Management Techniques and Practices I Current Cloud Computing Environments: A Survey", International Journal of Database Management Systems (IJDMS), vol. 7, No. 1, Feb. 2015, pp. 41-59.*

Binnig, Carsten, et al., "Distributed snapshot isolation: global transactions pay globally, local transactions pay locally", The VLDB Journal, vol. 23, Jun. 23, 2014, pp. 987-1011.*

Sun, Qiao, et al., "An Efficient Transaction Processing Method on the Distributed Database", CISP-BMEI 2016, Datong, China, Oct. 15-17, 2016, pp. 1916-1920.*

Akon Dey et al., 'Scalable Distributed Transactions across Heterogeneous Stores', Apr. 2015, DOI: 10.1109/ICDE.2015.7113278, 13 pages.

Seata, 'Seata AT mode', https://seata.io/en-us/docs/dev/mode/at-mode.html (retrieved on Jul. 14, 2023), 8 pages.

* cited by examiner

FIG. 6

LOCK MANAGEMENT TABLE

| KEY | EXCLUSION | PRS | CRS | DRS |
|---|---|---|---|---|
| key1 | GID13 | {} | {} | {} |
| key2 | GID12 | {} | {} | {} |

FIG. 7

TEMPORARY DATA MANAGEMENT TABLE

| KEY | GXID | INITIAL VALUE | INTERMEDIATE VALUE |
|---|---|---|---|
| key1 | GID13 | oldValue1 | newValue1 |
| key2 | GID12 | oldValue2 | newValue2 |

| COMMIT MANAGEMENT MAP ||
| 801 | 802 |
| KVS KEY | KVS VALUE |
| KVS1:GID10:$DTP | Committed:2022_0602_1800 |
| KVS1:GID11:$DTP | Committed:2022_0602_1815 |

SEQUENCE NUMBER MANAGEMENT FILE

901

ISSUANCE RESERVED SEQUENCE NUMBER

100

902

BATCH ISSUANCE CONSTANT

100

CONTROL METHOD, AND ADAPTER

TECHNICAL FIELD

The present invention relates to a control method and an adapter.

BACKGROUND ART

While the concept of distributed transaction processing has existed from the 1990s, machine performance of a CPU, and the like, had been prominently developed at that time, and thus, a plurality of databases could be stored in one server using machine resources achieved by scale-up. Thus, there had not been increasing demand for distributed transaction processing. In recent years, a microservice has become prevalent in accordance with development of cloud and container. In the microservice, each independent service stores its own unique data store. The data store is generic name of functions aimed at storage of data, such as a database and a key-value store (KVS). Thus, in order to implement an advanced service using a plurality of microservices, there has been increasing demand for the distributed transaction processing. Here, for an upstart data store product such as a KVS, there have been a number of development items such as scalability and availability with higher priority than priority of the distributed transaction processing, and thus, even if a transaction control function is implemented, implementation of the distributed transaction processing tends to be postponed.

SUMMARY OF INVENTION

Technical Problem

In an invention disclosed in Japanese Patent Laid-Open No. 2015-514247, processing when a data store is restored from down is not clear.

Solution to Problem

According to the 1st aspect of the present invention, a control method to be executed by an adapter to be coupled to a data store that has a transaction control function and does not have a distributed transaction control function, the data store comprising a commit management map that is an area for storing a GXID that is an identifier of a distributed transaction, the control method includes: alternate processing of, if the adapter accepts a reception query that is a query from an application program, locking data that is a target of the reception query, temporarily storing the reception query, and causing a transaction on the data store side to execute the reception query; perpetuation processing of, if the adapter accepts a prepare command from a transaction manager that manages distributed transaction control among a plurality of the data stores, determining whether or not commit is possible using lock information and perpetuating the GXID to be committed and the temporarily stored reception query in a case where commit is possible; settlement processing of, if the adapter accepts a commit command from the transaction manager, causing the transaction on the data store side to execute a GXID addition query that is a query that adds the GXID to be committed to the commit management map and committing the transaction on the data store side; and store restart processing of, if the data store is restored from down, the adapter starting a new transaction at the data store for a distributed transaction in an in-doubt state with reference to the commit management map to reproduce the perpetuated query and committing a distributed transaction that is supposed to be committed but remains in an in-doubt state.

According to the 2nd aspect of the present invention, a control method to be executed by an adapter to be coupled to a data store that has neither a transaction control function nor a distributed transaction control function, the data store comprising a commit management map that is an area for storing a GXID that is an identifier of a distributed transaction, the control method includes: alternate processing of, if the adapter accepts a reception query that is a query from an application program, locking data that is a target of the reception query, acquiring initial data that is a target of the reception query from the data store, simulating execution of the reception query instead of the data store using the initial data or intermediate data, and holding a result of the simulation as the intermediate data; perpetuation processing of, if the adapter accepts a prepare command from a transaction manager that manages distributed transaction control among a plurality of the data stores, determining whether or not commit is possible using lock information, and perpetuating the GXID to be committed, the initial data and the reception query that is simulated in a case where commit is possible; settlement processing of, if the adapter accepts a commit command from the transaction manager, causes the data store to execute a series of queries in which a query that updates to initial data, the reception query and a GXID addition query that is a query that adds the GXID to the commit management map are coupled; and store restart processing of, if the data store is restored from down, committing a distributed transaction that is supposed to be committed but remains in an in-doubt state with reference to the commit management map of the data store.

According to the 3rd aspect of the present invention, an adapter to be coupled to a data store that has a transaction control function and does not have a distributed transaction control function, the data store comprising a commit management map that is an area for storing a GXID that is an identifier of a distributed transaction, the adapter includes: an alternate unit configured to, if the adapter accepts a reception query that is a query from an application program, lock data that is a target of the reception query, temporarily store the reception query and cause a transaction on the data store side to execute the reception query; a perpetuation unit configured to, if the adapter accepts a prepare command from a transaction manager that manages distributed transaction control among a plurality of the data stores, determine whether or not commit is possible using lock information and perpetuate the GXID to be committed and the temporarily stored reception query in a case where commit is possible; a settlement processing unit configured to, if the adapter accepts a commit command from the transaction manager, cause the transaction on the data store side to execute a GXID addition query that is a query that adds the GXID to be committed to the commit management map and commit the transaction on the data store side; and a store restart processing unit configured so that, if the data store is restored from down, the adapter starts a new transaction at the data store for a distributed transaction in an in-doubt state to reproduce the perpetuated reception query with reference to the commit management map and commits a distributed transaction that is supposed to be committed but remains in an in-doubt state.

SUMMARY OF THE INVENTION

According to the present invention, it is possible to promptly start a service when a data store is restored from down.

BRIEF DESCRIPTION OF DRAWINGS

FIG. 6 is a view indicating an example of a lock management table;

FIG. 7 is a view indicating an example of a temporary data management table;

FIG. 8 is a view indicating an example of a commit management map;

FIG. 9 is a view indicating an example of a sequence number management file;

DESCRIPTION OF EMBODIMENTS

First Embodiment

A first embodiment of a processing system will be described below with reference to FIG. 1 to FIG. 35.
(Configuration)

Figure 1:
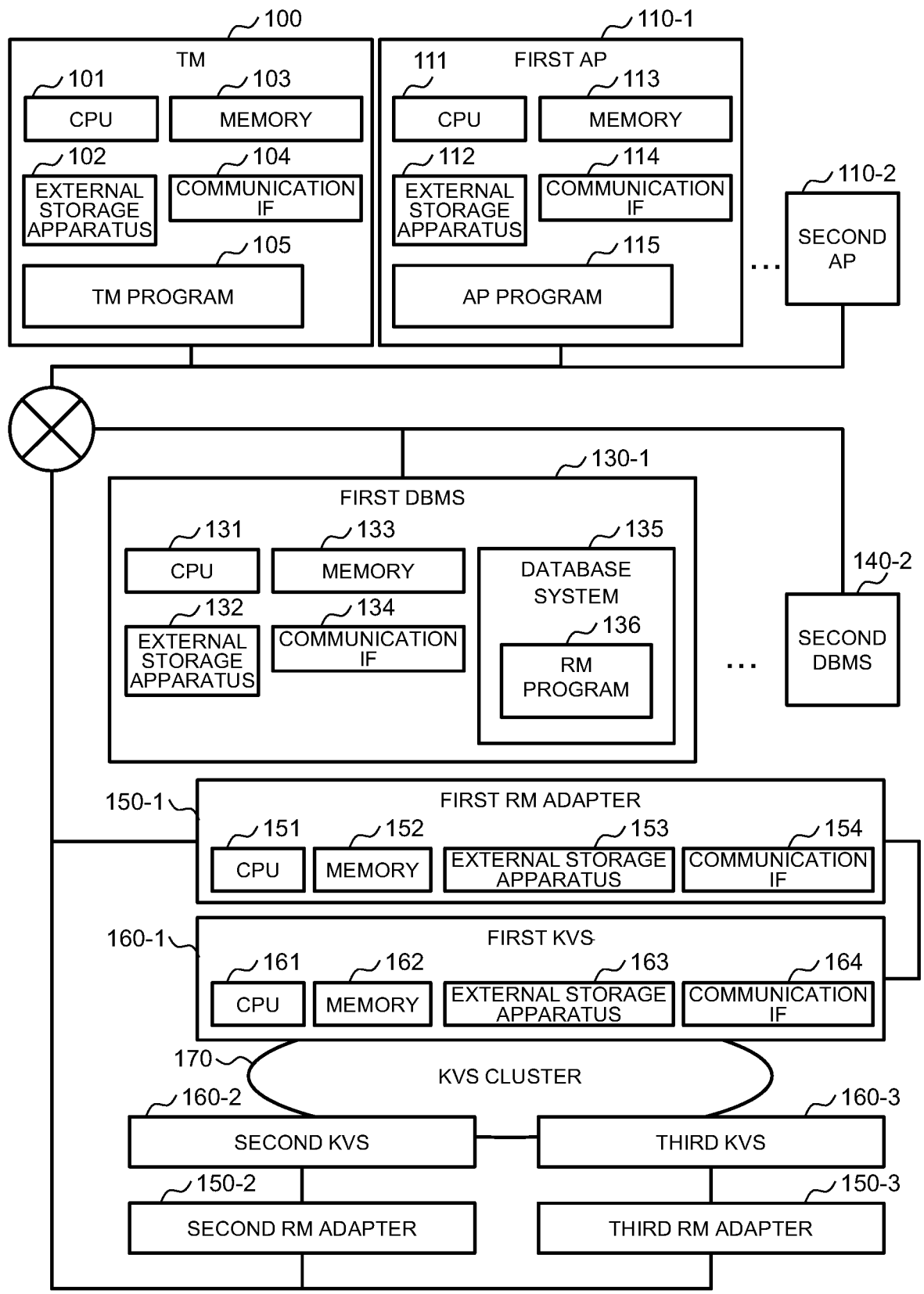
FIG. 1 is an overall configuration diagram of a processing system.

FIG. 1 is an overall configuration diagram of a processing system 1. The processing system 1 includes a TM 100, a first AP 110-1, a second AP 110-2, a first DBMS 130-1, a second DBMS 130-2, a first RM adapter 150-1, a second RM adapter 150-2, a third RM adapter 150-3, a first KVS 160-1, a second KVS 160-2, and a third KVS 160-3. The first KVS 160-1, the second KVS 160-2 and the third KVS 160-3 form a KVS cluster 170.

The first AP 110-1 and the second AP 110-2 include common components which will be described later. The first AP 110-1 and the second AP 110-2 may include components other than the components which will be described later or may include components provided at only one of the first AP 110-1 and the second AP 110-2. Hereinafter, in a case where the first AP 110-1 and the second AP 110-2 are not distinguished from each other, they will be referred to as an AP 110. While the processing system 1 illustrated in FIG. 1 includes two APs 110, the processing system 1 only requires to include at least one AP 110, and there is no upper limit in the number of the APs 110 included in the processing system 1.

The first DBMS 130-1 and the second DBMS 130-2 include common components which will be described later. The first DBMS 130-1 and the second DBMS 130-2 may include components other than the components which will be described later or may include components provided at only one of the first DBMS 130-1 and the second DBMS 130-2. Hereinafter, in a case where the first DBMS 130-1 and the second DBMS 130-2 are not distinguished from each other, they will be referred to as a DBMS 130. While the processing system 1 illustrated in FIG. 1 includes two DBMSs 130, the number of DBMSs 130 included in the processing system 1 is zero or one or more, and there is no upper limit in the number of DBMSs 130 included in the processing system 1.

The first KVS 160-1, the second KVS 160-2 and the third KVS 160-3 include common components which will be described later. The first KVS 160-1, the second KVS 160-2 and the third KVS 160-3 may include components other than the components which will be described later or may include components provided at only one of the first KVS 160-1, the second KVS 160-2 and the third KVS 160-3. Hereinafter, in a case where the first KVS 160-1, the second KVS 160-2 and the third KVS 160-3 are not distinguished from one another, they will be referred to as a KVS 160. Note that hereinafter, the KVS 160 will be also referred to as a "data store". The processing system 1 illustrated in FIG. 1 only requires to include at least two KVSs 160, and there is no upper limit in the number of KVSs 160 included in the processing system 1. Further, while the processing system 1 illustrated in FIG. 1 includes one KVS cluster 170, the processing system 1 only requires to include at least one KVS cluster 170, and there is no upper limit in the number of KVS clusters 170 included in the processing system 1. The TM 100, the AP 110, the DBMS 130 and the RM adapter 150 are connected by a network. These apparatuses may perform communication with one another either in a wired manner or in a wireless manner.

The first RM adapter 150-1, the second RM adapter 150-2 and the third RM adapter 150-3 include common components which will be described later. The first RM adapter 150-1, the second RM adapter 150-2 and the third RM adapter 150-3 may include components other than the components which will be described later and may include components provided at only one of the first RM adapter 150-1, the second RM adapter 150-2 and the third RM adapter 150-3. Hereinafter, in a case where the first RM adapter 150-1, the second RM adapter 150-2 and the third RM adapter 150-3 are not distinguished from one another, they will be referred to as an RM adapter 150. Note that hereinafter, the RM adapter 150 will be also referred to as a "data store adapter" or an "adapter". Each of the RM adapters 150 corresponds to the KVS 160 at 1:1. In other words, the processing system 1 includes the RM adapters 150 of the same number as the number of KVSs 160.

Hereinafter, a pair of the RM adapter 150 and the KVS 160 set in advance will be expressed as "one pair", "corresponding" or "coupled". For example, as illustrated in FIG. 1, it can be expressed that the first RM adapter 150-1 corresponds to the first KVS 160-1. Further, it can be also expressed that the RM adapter 150 to be coupled to the second KVS 160-2 is the second RM adapter 150-2.

The KVS 160 that is a key value store may have a transaction control function or does not have a transaction control function. Whether or not the transaction control function is provided does not have to be common among the KVSs 160 that constitute the processing system 1, and, for example, a configuration may be employed where only the first KVS 160-1 has the transaction control function, and the second KVS 160-2 and the third KVS 160-3 do not have the transaction control function. Further, in a case where distributed transaction that is being executed does not exist, in other words, in a case where a GXID management table 204 of the corresponding RM adapter 150 is empty, a state of the transaction control function of the KVS 160 may be switched between valid and invalid. Components to be included in the RM adapter 150 to be paired become different in accordance with whether or not the KVS 160 has the transaction control function. Components in a case where the KVS 160 has the transaction control function will be described later with reference to FIG. 2, and components in a case where the KVS 160 does not have the transaction control function will be described later with reference to FIG. 3.

Each of the RM adapters 150 can grasp in advance or in real time whether or not the corresponding KVS 160 has the transaction control function. In the present embodiment, one of optimistic lock and pessimistic lock may be employed as exclusion control. Further, employment of optimistic lock and pessimistic lock does not have to be common among the RM adapters 150 that constitute the processing system 1, and, for example, a configuration may be employed where only the first RM adapter 150-1 employs pessimistic lock, and the second RM adapter 150-2 and the third RM adapter 150-3 employ optimistic lock. Still further, in a case where distributed transaction that is being executed does not exist, in other words, in a case where the GXID management table 204 of the RM adapter 150 is empty, a mode of exclusion control at the RM adapter 150 may be switched between optimistic lock and pessimistic lock. However, each of the RM adapters 150 can grasp in advance or in real time which of optimistic lock and pessimistic lock is to be employed. Differences in processing in accordance with schemes of exclusion control will be described later with reference to flowcharts, and the like.

The TM 100 manages transactions. The TM 100 includes a CPU 101 that is a central processing unit, a memory 103 that is a main memory such as a DIMM, an external storage apparatus 102 that is a non-volatile storage apparatus such as a hard disc, a communication interface (hereinafter, described as a "communication IF") 104 that implements communication, and a TM program 105 that manages transactions. The CPU 101 implements the TM program 105 by loading a program stored in the external storage apparatus 102 to the memory 103 and executing the program.

Operation of the TM 100 which will be described in the present embodiment is implemented by the TM program 105. The TM 100 transmits an XA command to each of the RM adapters 150. The XA command includes four commands of xa_start, xa_prepare, xa_commit and xa_rollback, and all of the four commands include GXIDs that are IDs of distributed transactions as arguments. Note that these four XA commands will be also respectively referred to as a start command, a prepare command, a commit command and a rollback command.

The AP 110 executes an application. The AP 110 includes a CPU 111 that is a central processing unit, a memory 113 that is a main memory such as a DIMM, an external storage apparatus 112 that is a non-volatile storage apparatus such as a hard disc, a communication IF 114 that implements communication, and an AP program 115 that executes the application. The CPU 111 implements the AP program 115 by loading a program stored in the external storage apparatus 112 to the memory 113 and executing the program. Operation of the AP 110 which will be described in the present embodiment is implemented by the AP program 115.

The DBMS 130 manages a database. The DBMS 130 includes a CPU 131 that is a central processing unit, a memory 133 that is a main memory such as a DIMM, an external storage apparatus 132 that is a non-volatile storage apparatus such as a hard disc, a communication IF 134 that implements communication, and a database system 135. The database system 135 includes an RM program 136 that manages resources. The CPU 131 implements the RM program 136 by loading a program stored in the external storage apparatus 132 to the memory 133 and executing the program.

The RM adapter 150 includes a CPU 151 that is a central processing unit, a memory 152 that is a main memory such as a DIMM, an external storage apparatus 153 that is a non-volatile storage apparatus such as a hard disc, and a communication IF 153 that implements communication. The CPU 151 implements a function which will be described later by loading a program stored in the external storage apparatus 132 to the memory 152 and executing the program.

The KVS 160 includes a CPU 161 that is a central processing unit, a memory 162 that is a main memory such as a DIMM, an external storage apparatus 163 that is a non-volatile storage apparatus such as a hard disc, and a communication IF 163 that implements communication. The CPU 161 implements a function which will be described later by loading a program stored in the external storage apparatus 163 to the memory 162 and executing the program. The KVS 160 needs to satisfy at least "D", that is, durability which is a characteristic not provided by the RM adapter 150 among ACID characteristics to be satisfied by distributed transaction control. Note that durability means that registered data does not disappear even if any failure occurs.

Figure 2:
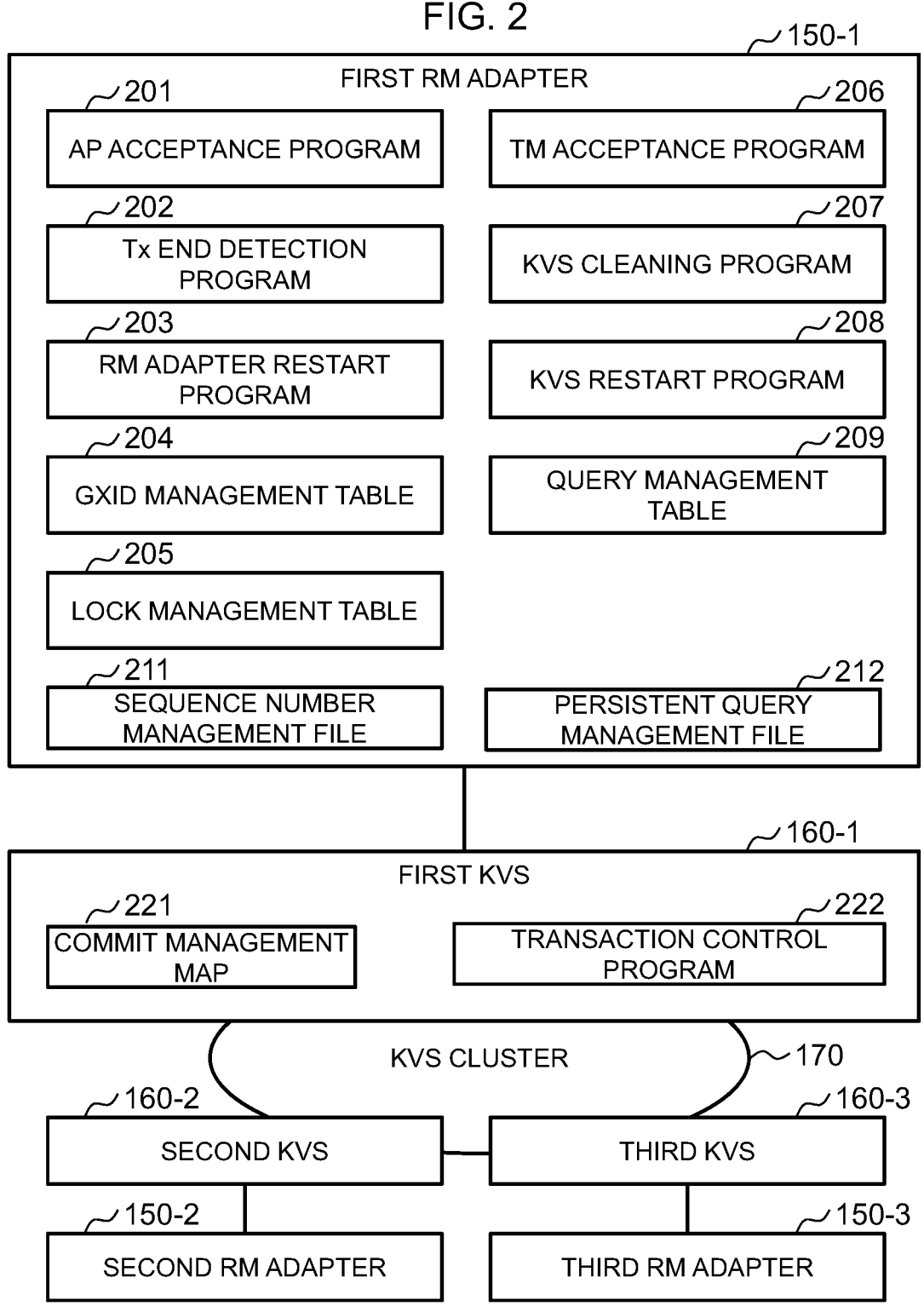
FIG. 2 is a functional configuration diagram of a first RM adapter and a first KVS in a case where the first KVS has a transaction control function.

FIG. 2 is a functional configuration diagram of the first RM adapter 150-1 and the first KVS 160-1 in a case where the first KVS 160-1 has the transaction control function. However, FIG. 2 also illustrates data stored in the first RM adapter 150-1 and the first KVS 160-1. The first RM adapter 150-1 includes an AP acceptance program 201, a Tx end detection program 202, an RM adapter restart program 203, a GXID management table 204, a lock management table 205, a TM acceptance program 206, a KVS cleaning program 207, a KVS restart program 208, a query management table 209, a sequence number management file 211, and a persistent query management file 212. The first KVS 160-1 includes a commit management map 221, and a transaction control program 222 that implements the transaction control function.

While processing of each program will be described in detail later, the RM adapter restart program 203 is executed when the RM adapter 150 is restored from down, and the KVS restart program 208 is executed when the KVS 160 is restored from down. The "down" described here refers to stop of a function without predetermined procedure being performed, and, for example, occurs by stop of power supply or disconnection of a communication path. However, the RM adapter restart program 203 and the KVS restart program 208 may be executed also in a case where the function is stopped by the predetermined procedure being performed.

Figure 3:
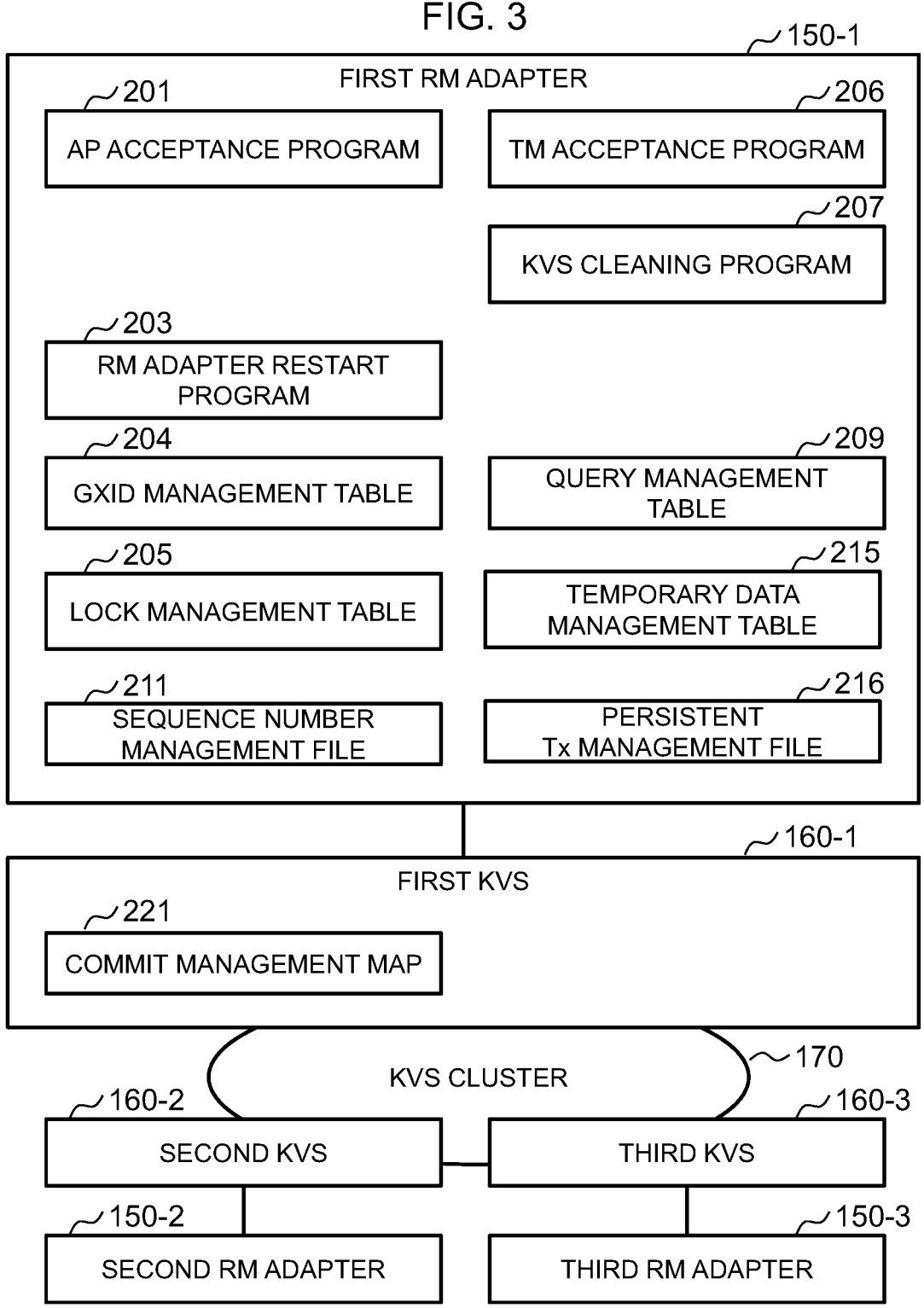
FIG. 3 is a functional configuration diagram of the first RM adapter and the first KVS in a case where the first KVS does not have a transaction control function.

FIG. 3 is a functional configuration diagram of the first RM adapter 150-1 and the first KVS 160-1 in a case where the first KVS 160-1 does not have the transaction control function. However, FIG. 3 also illustrates data stored in the first RM adapter 150-1 and the first KVS 160-1. The first RM adapter 150-1 further includes a temporary data management table 215 and a persistent Tx management file 216 in addition to the components illustrated in FIG. 2. The KVS restart program 208 is executed when the KVS 160 is restored from down. However, the first RM adapter 150-1 does not have to include the persistent query management file 212 illustrated in FIG. 2. The first KVS 160-1 does not include the transaction control program 222 illustrated in FIG. 2.

Figure 4:
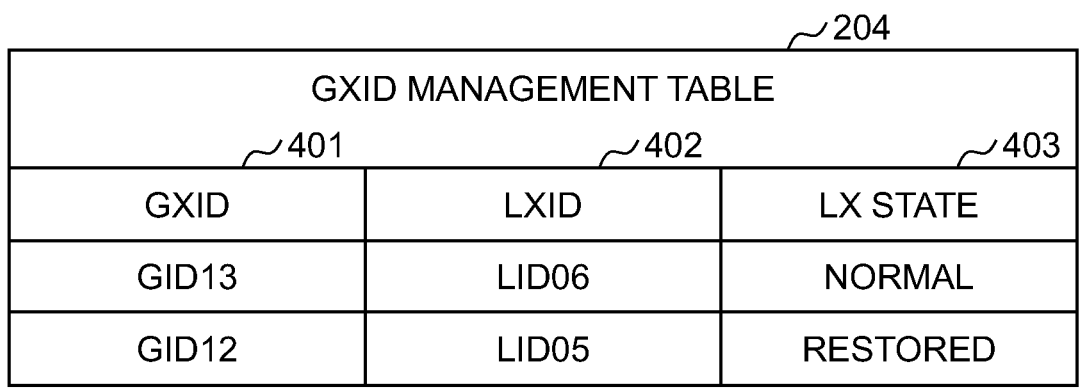
FIG. 4 is a view indicating an example of a GXID management table.

FIG. 4 is a view indicating an example of the GXID management table 204. The GXID management table 204 is used to manage a distributed transaction issued by a TM. The GXID management table 204 is constituted with one or a plurality of records, and each record has fields of a GXID 401, an LXID 402 and an LX state 403. In the GXID management table 204, a value of the GXID 401 is a unique key. To the GXID 401, an ID (hereinafter, a GXID) of the distributed transaction issued by a transaction manager is assigned.

To the LXID 402, an ID (LXID) of a transaction generated by the transaction control function of the data store is assigned. However, in a case where the KVS 160 does not have the transaction control function, "-" is always assigned to the LXID 402. To the LX state 403, one of "normal" and "restored" is assigned. However, in a case where the KVS 160 does not have the transaction control function, "normal" is always assigned to the LX state 403.

Figure 5:
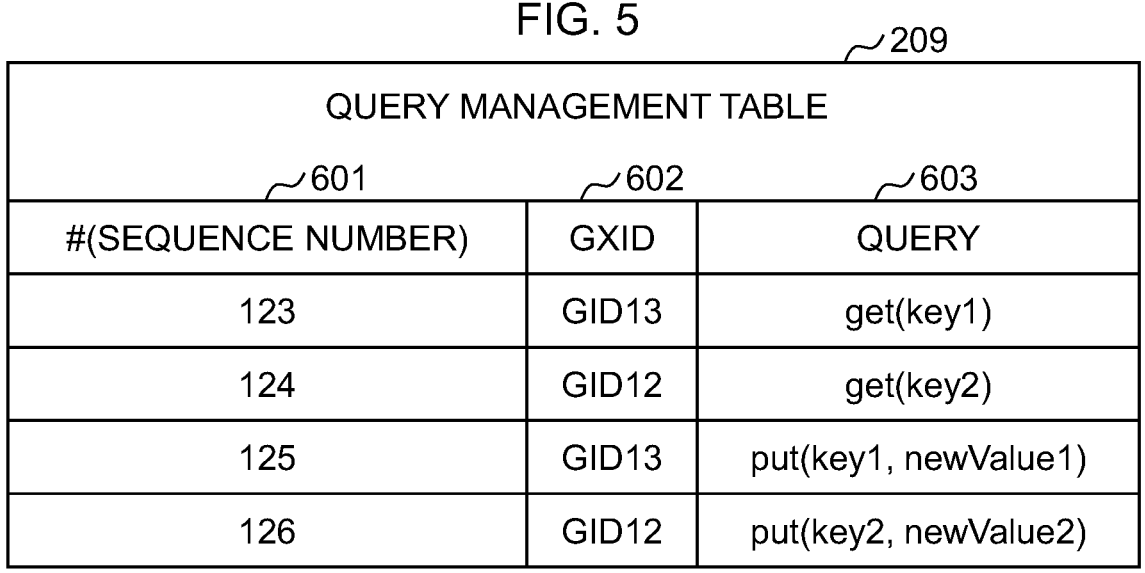
FIG. 5 is a view indicating an example of a query management table.

FIG. 5 is a view indicating an example of the query management table 209. The query management table 209 manages queries populated by the AP 110. The query management table 209 is constituted with one or a plurality of records, and each record has fields of a sequence number 601, a GXID 602 and a query 603. In the query management table 209, a combination of a value of the GXID 602 and a value of the sequence number 601 is a unique key. To the sequence number 601, a sequence number generated using a sequence number management file 211 is assigned. The GXID 602 is similar to the GXID 401 in FIG. 4, and a GXID issued by the transaction manager is assigned. To a query sequence, queries constituting distributed transaction processing issued by an application program are assigned.

FIG. 6 is a view indicating an example of the lock management table 205. The lock management table 205 manages an exclusion of data operated by the AP 110. The lock management table 205 is constituted with one or a plurality of records, and each record has fields of a key 501, an exclusion 502, a PRS 503, a CRS 504 and a DRS 505. In the lock management table 205, a value of a key 501 is a unique key. To the key 501, a key of data to be operated by queries constituting the distributed transaction processing issued by the application program is assigned.

To the exclusion 502, zero to one GXID of the distributed transaction that acquires the exclusion of this data is assigned. To the fields of the PRS 503, the CRS 504 and the DRS 505, a data structure called a "Set collection" or a "Set type" is assigned. In a case where pessimistic lock is employed in the exclusion control, the fields of the PRS 503, the CRS 504 and the DRS 505 are not used, and thus, the fields are fixed with "{ }" indicating an empty set. While the present data structure is employed to simplify the drawings and description, data may be managed using a plurality of tables.

In the PRS 503, data that is not updated (dirty) is read, and zero or more GXIDs of the distributed transactions that have not reached prepare yet are stored. The "PRS" means Pending-Read-Set, that is, an unresolved read set. In the CRS 504, data that is not dirty is read, and zero or more GXIDs of the distributed transactions in an in-doubt state are stored. The distributed transaction that acquires the exclusion of this data cannot end prepare until all the distributed transactions included in this set are committed, that is, this set becomes an empty set. The "CRS" means Clean-Read-Set, that is, a clean read set.

In the DRS 505, zero or more GXIDs of the distributed transaction processing that reads dirty data are stored. The distributed transactions stored in this set always become errors in prepare, and the distributed transactions are interrupted. The "DRS" means Dirty-Read-Set, that is, a dirty read set.

FIG. 7 is a view indicating an example of the temporary data management table 215. The temporary data management table 215 manages change content of data operated by the AP 110. The temporary data management table 215 is constituted with one or a plurality of records, and each record has fields of a key 701, a GXID 702, an initial value 703, and an intermediate value 704. In the temporary data management table 215, a combination of a value of the GXID 702 and a value of the key 701 is a unique key. The key 701 and the GXID 702 are similar to the key 501 in FIG. 6 and the GXID 401 in FIG. 4.

In the initial value 703, a value corresponding to the key 701 at a time point of start of the distributed transaction is stored. If a value corresponding to the key does not exist in the data store, "NIL", "NULL", or the like, that is a special character string indicating that a value does not exist in the initial value 703 is stored. To the intermediate value 704, a value of the initial value 703 is assigned at first, and if a simulation of the query by the RM adapter 150 is completed, the intermediate value 704 is overwritten with a simulation result.

FIG. 8 is a view indicating an example of the commit management map 221. The commit management map 221 manages the committed distributed transaction. The commit management map 221 is constituted with one or a plurality of records, and each record has fields of a KVS key 801 and a KVS value 802. In the commit management map 221, a value of the KVS key 801 is a unique key.

In the KVS key 801, information for uniquely identifying the KVS or the RM adapter 150 and data based on the committed GXID are stored. In a first record in the example indicated in FIG. 8, a character string in which "KVS1" indicating the first KVS 601-1, "GID10" that is a GXID, and "$DTP" that is a collision avoidance keyword are delimited and coupled with colons is stored. Order, a delimiter, a collision avoidance keyword, and the like, of each character string may be modified as needed. In the KVS value 802, data based on time when the distributed transaction processing is committed is stored. In the example indicated in FIG. 8, a combination of a character string of "Committed:" and numbers indicating year, month, date, hour, and minute is stored. "Committed:" may be another character string, and fineness of date and time may be changed as appropriate in accordance with a frequency of the commit. Further, other kinds of metadata may be included in the KVS value 802.

FIG. 9 is a view indicating an example of the sequence number management file 211. The sequence number management file 211 persistently manages the sequence number issued by the RM adapter 150. The sequence number management file 211 includes an issuance reserved sequence number 901 and a batch issuance constant 902. In the issuance reserved sequence number 901, a sequence number which has been reserved to be issued is stored. In the batch issuance constant 902, a predetermined constant is stored. The batch issuance constant 902 is referred to when the RM adapter 150 is restored from down.

Figure 10:
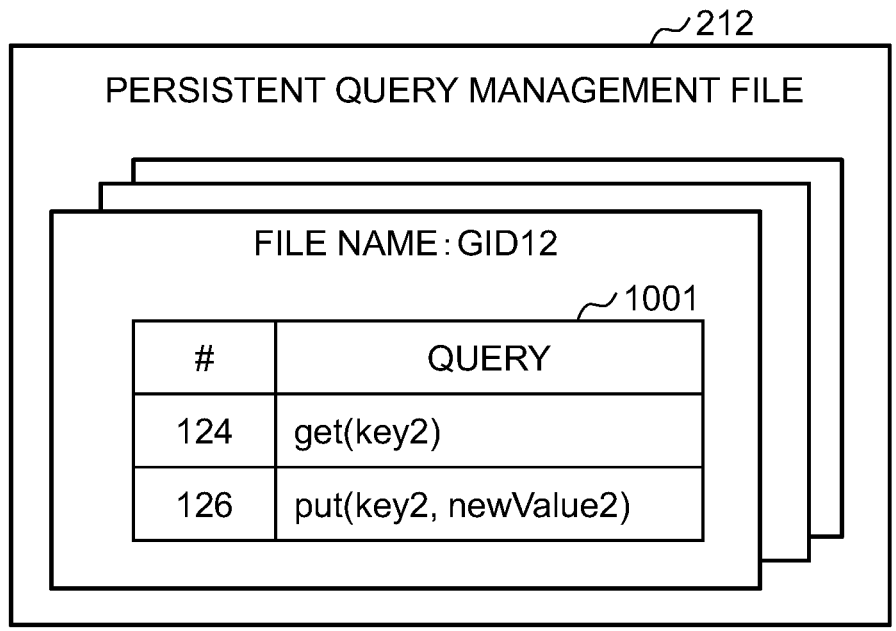
FIG. 10 is a view indicating an example of a persistent query management file.

FIG. 10 is a view indicating an example of the persistent query management file 212. The persistent query management file 212 persistently manages the query populated by the AP 110. The persistent query management file 212 is generated for each GXID, and it is assumed in the present embodiment, the file name is a GXID itself. In other words, the persistent query management file 212 is a generic name of a file which is generated for each GXID and which persistently manages the query populated by the AP 110. In each persistent query management file 212, one or more combinations of the sequence number and the query are stored.

Figure 11:
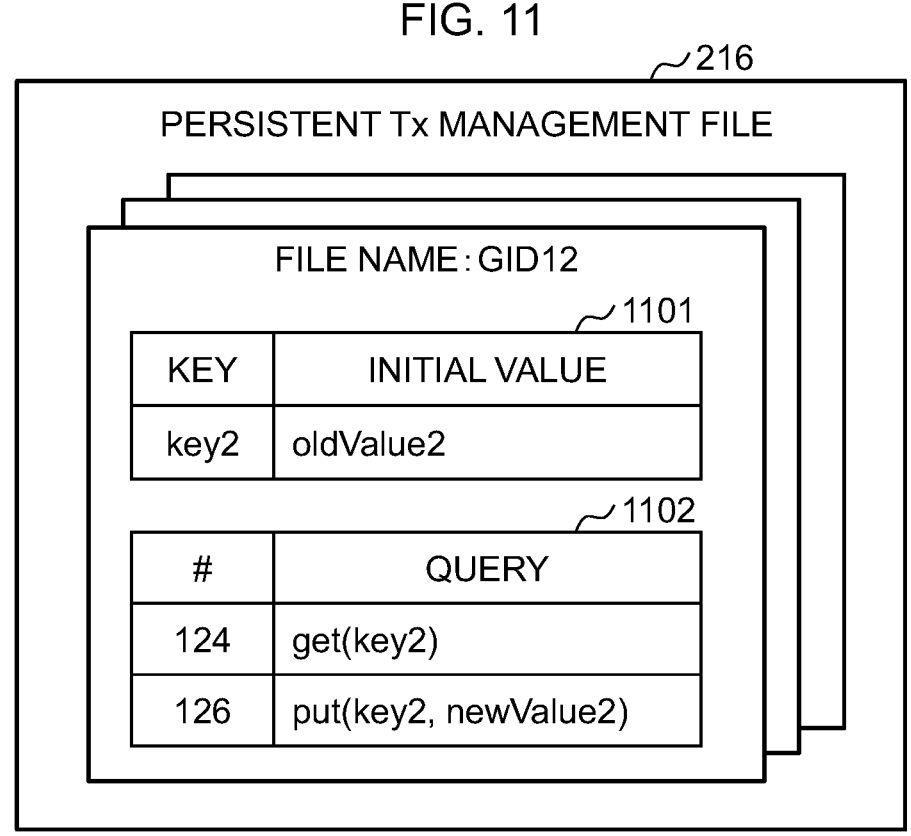
FIG. 11 is a view indicating an example of a persistent Tx management file.

FIG. 11 is a view indicating an example of the persistent Tx management file 216. The persistent Tx management file 216 persistently manages the query populated by the AP 110 and initial data. The persistent Tx management file 216 is generated for each GXID, and it is assumed in the present embodiment, the file name is a GXID itself. In other words, the persistent Tx management file 216 is a generic name of a file which is generated for each GXID and which persistently manages the query populated by the AP 110 and the initial data.

(Flowchart)

Figure 12:
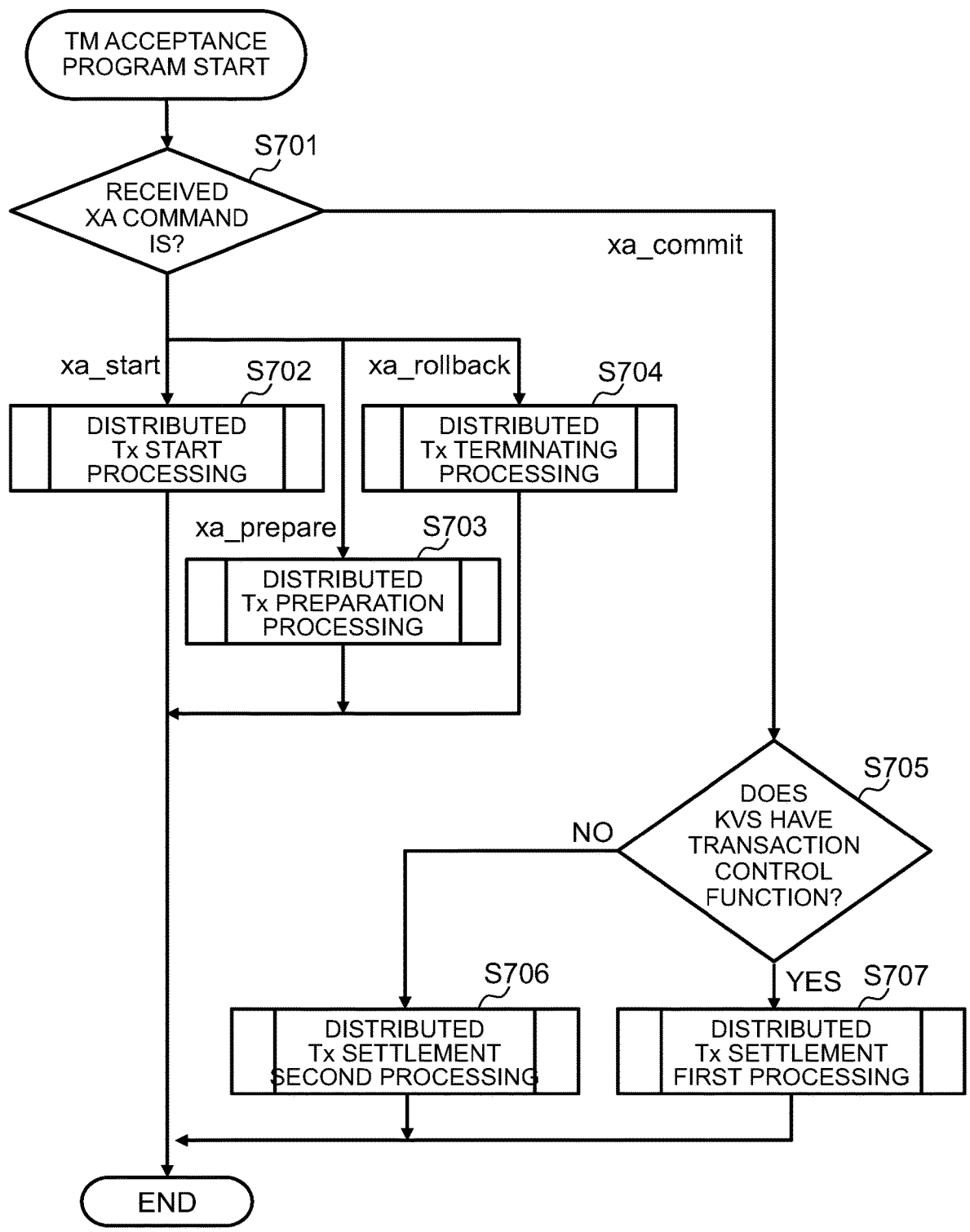
FIG. 12 is a flowchart indicating processing of a TM acceptance program.

FIG. 12 is a flowchart indicating processing of the TM acceptance program 206. The TM acceptance program 206 is started when any XA command is received from the TM 100. As described above, each XA command includes a GXID as an argument, and thus, when the flowchart which will be described below is executed, the XA command and the GXID provided as the argument are specified. Hereinafter, the GXID provided as the argument of the XA command from the TM 100 will be referred to as a "designated GXID".

The TM acceptance program 206 first determines a type of the XA command received in step S701. The TM acceptance program 206 proceeds to step S702 in a case where it is determined that the received XA command is "xa_start", proceeds to step S703 in a case where it is determined that the received XA command is "xa_prepare", proceeds to step S704 in a case where it is determined that the received XA command is "xa_rollback", and proceeds to step S705 in a case where it is determined that the received XA command is "xa_commit". In step S702, the TM acceptance program 206 starts distributed Tx start processing which will be described in detail later with reference to FIG. 14 and ends the processing indicated in FIG. 12. In step S703, the TM acceptance program 206 starts distributed TX preparation processing which will be described in detail later with reference to FIG. 18 and ends the processing indicated in FIG. 12. In step S704, the TM acceptance program 206 starts distributed Tx terminating processing which will be described in detail later with reference to FIG. 13 and ends the processing indicated in FIG. 12.

In step S705, the TM acceptance program 206 determines whether or not the KVS 160 coupled to the RM adapter 150 that is executing the program has the transaction control function. The TM acceptance program 206 proceeds to step S707 in a case where it is determined that the coupled KVS 160 has the transaction control function and proceeds to step S706 in a case where it is determined that the coupled KVS 160 does not have the transaction control function. In step S706, the TM acceptance program 206 starts distributed Tx settlement second processing which will be described in detail later with reference to FIG. 21 and ends the processing indicated in FIG. 12. In step S707, the TM acceptance program 206 starts distributed Tx settlement first processing which will be described in detail later with reference to FIG. 20 and ends the processing indicated in FIG. 12.

Figure 13:
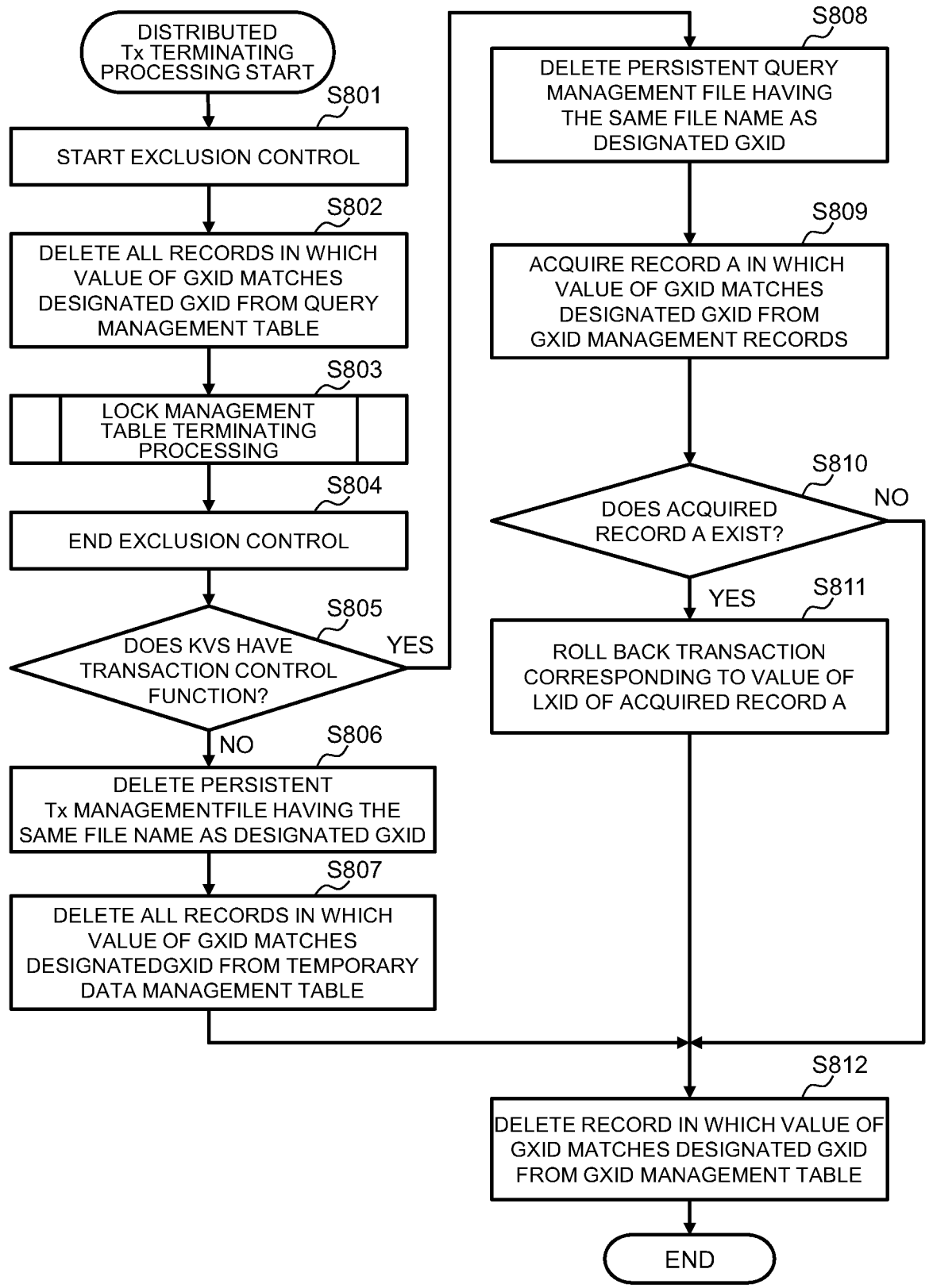
FIG. 13 is a flowchart indicating distributed Tx terminating processing.

FIG. 13 is a flowchart indicating distributed Tx terminating processing to be executed by the TM acceptance program 206. FIG. 13 can be also regarded as indicating detailed processing of step S704 in FIG. 12. The TM acceptance program 206 first starts exclusion control in step S801. In the subsequent step S802, the TM acceptance program 206 deletes all records in which a value of the GXID 602 in the query management table 209 matches the designated GXID. In the subsequent step S803, the TM acceptance program 206 executes lock management table terminating processing which will be described in detail later with reference to FIG. 26 and proceeds to step S804. In step S804, the TM acceptance program 206 ends the exclusion control.

In the subsequent step S805, the TM acceptance program 206 determines whether or not the coupled KVS 160 has the transaction control function. The TM acceptance program 206 proceeds to step S808 in a case where it is determined that the coupled KVS 160 has the transaction control function and proceeds to step S806 in a case where it is determined that the coupled KVS 160 does not have the transaction control function. In step S806, the TM acceptance program 206 deletes the persistent Tx management file 216 having the same file name as the designated GXID. In the subsequent step S807, the TM acceptance program 206 deletes all records in which a value of the GXID 702 in the temporary data management table 215 matches the designated GXID and proceeds to step S812.

In step S808, the TM acceptance program 206 deletes the persistent query management file 212 having the same file name as the designated GXID. In the subsequent step S809, the TM acceptance program 206 acquires a record A in which a value of the GXID 401 matches the designated GXID in the GXID management table 204. In the subsequent step S810, the TM acceptance program 206 determines whether or not the record A exists. In other words, in the present step, it is determined whether or not a record of the GXID management table 204 having a value of the GXID 401 matching the designated GXID exists. The TM acceptance program 206 proceeds to step S811 in a case where it is determined that the record A exists and proceeds to step S812 in a case where it is determined that the record A does not exist.

In step S811, the TM acceptance program 206 rolls back a transaction corresponding to a value of the LXID 402 of the acquired record A and proceeds to step S812. In step S812, the TM acceptance program 206 deletes a record in which a value of the GXID 401 in the GXID management table 204 matches the designated GXID and ends the processing indicated in FIG. 13.

Figure 14:
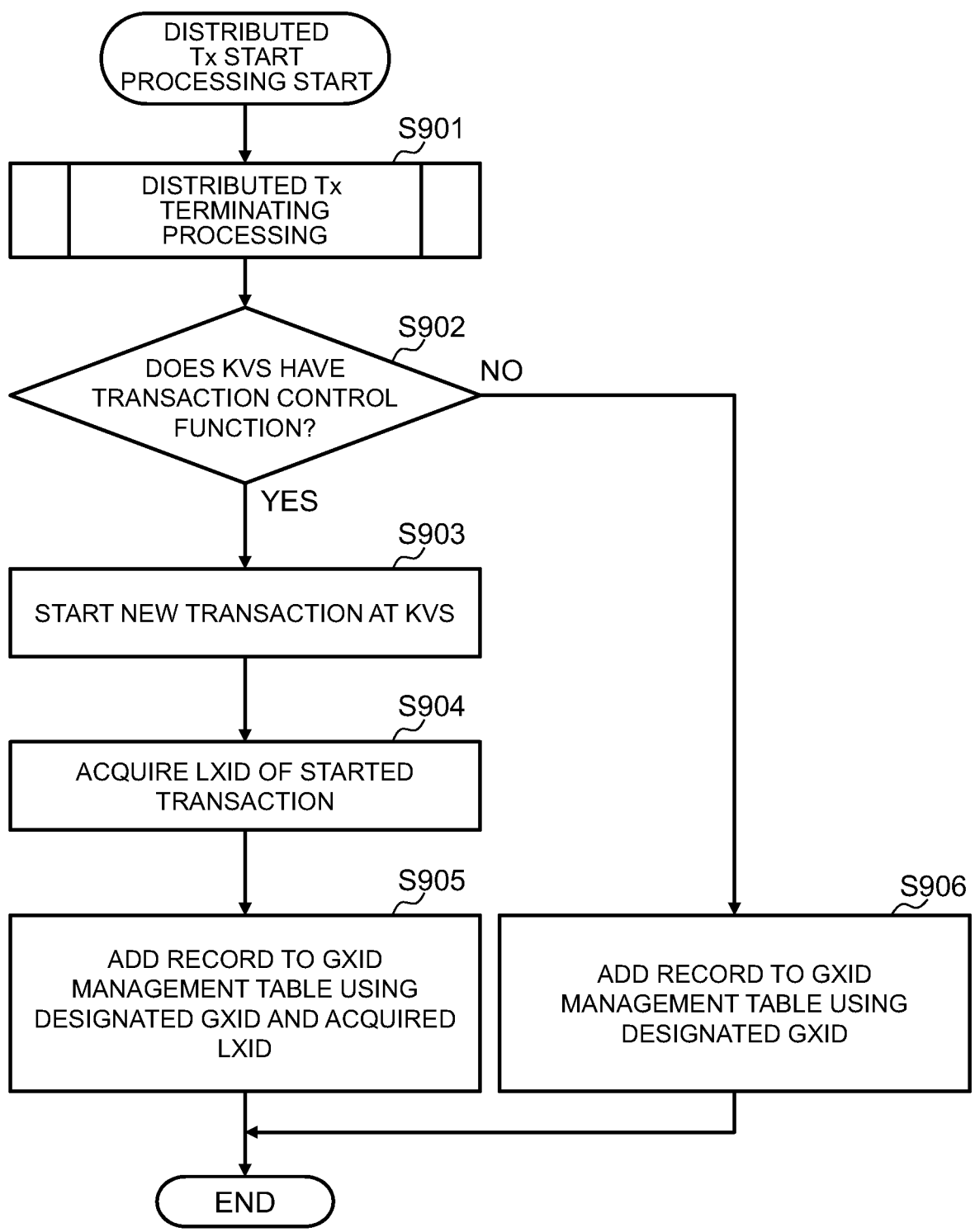
FIG. 14 is a flowchart indicating distributed Tx start processing.

FIG. 14 is a flowchart indicating distributed Tx start processing to be executed by the TM acceptance program 206. FIG. 13 can be also regarded as indicating detailed processing of step S702 in FIG. 12. The TM acceptance program 206 first executes the distributed Tx terminating processing in step S901. In the subsequent step S902, the TM acceptance program 206 determines whether or not the coupled KVS 160 has the transaction control function. The TM acceptance program 206 proceeds to step S903 in a case where it is determined that the coupled KVS 160 has the transaction control function and proceeds to step S906 in a case where it is determined that the coupled KVS 160 does not have the transaction control function.

In step S903, the TM acceptance program 206 starts a new transaction at the coupled KVS 160. In the subsequent step S904, the TM acceptance program 206 acquires an LXID of the started transaction. In the subsequent step S905, the TM acceptance program 206 adds a new record to the GXID management table 204 using the designated GXID and the LXID acquired from the KVS 160 and ends the processing indicated in FIG. 14. However, the LX state 403 of this record is "normal". In step S906, the TM acceptance program 206 adds a new record to the GXID management table 204 using the designated GXID and ends the processing indicated in FIG. 14. However, the LXID 402 of this record is "-", and the LX state 403 is "normal".

Figure 15:
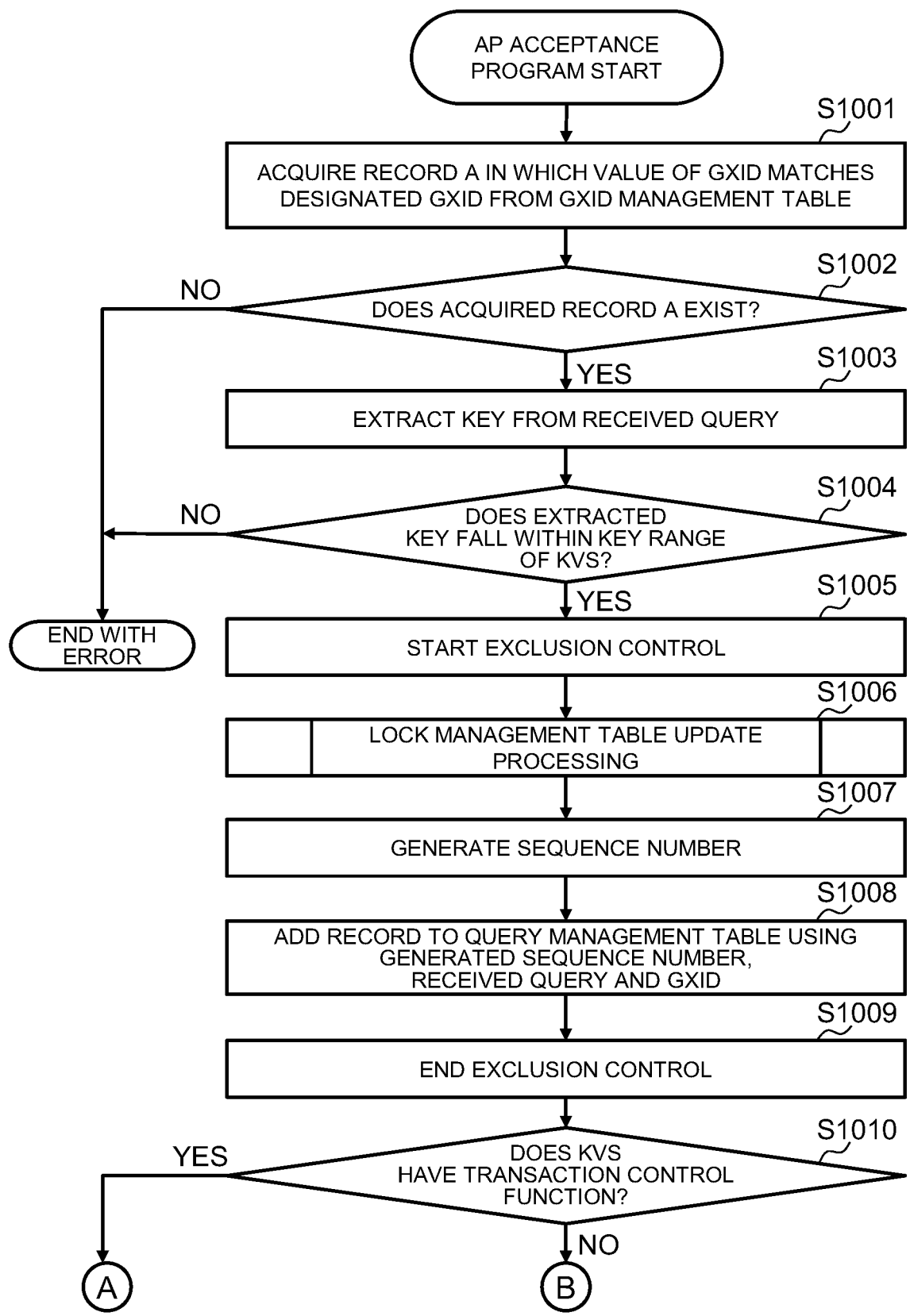
FIG. 15 is a flowchart indicating processing of an AP acceptance program.
Figure 16:
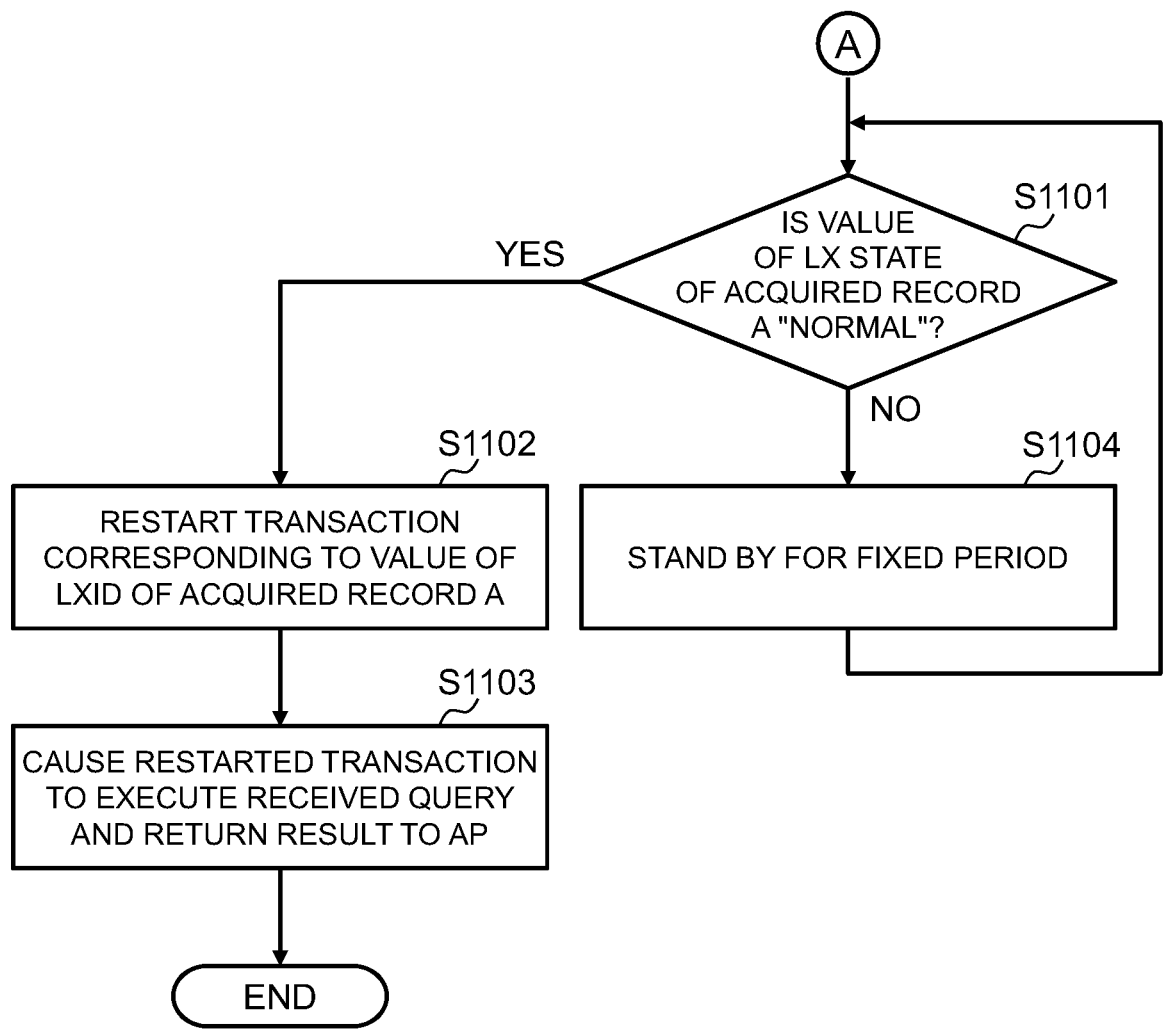
FIG. 16 is a flowchart indicating the processing of the AP acceptance program.
Figure 17:
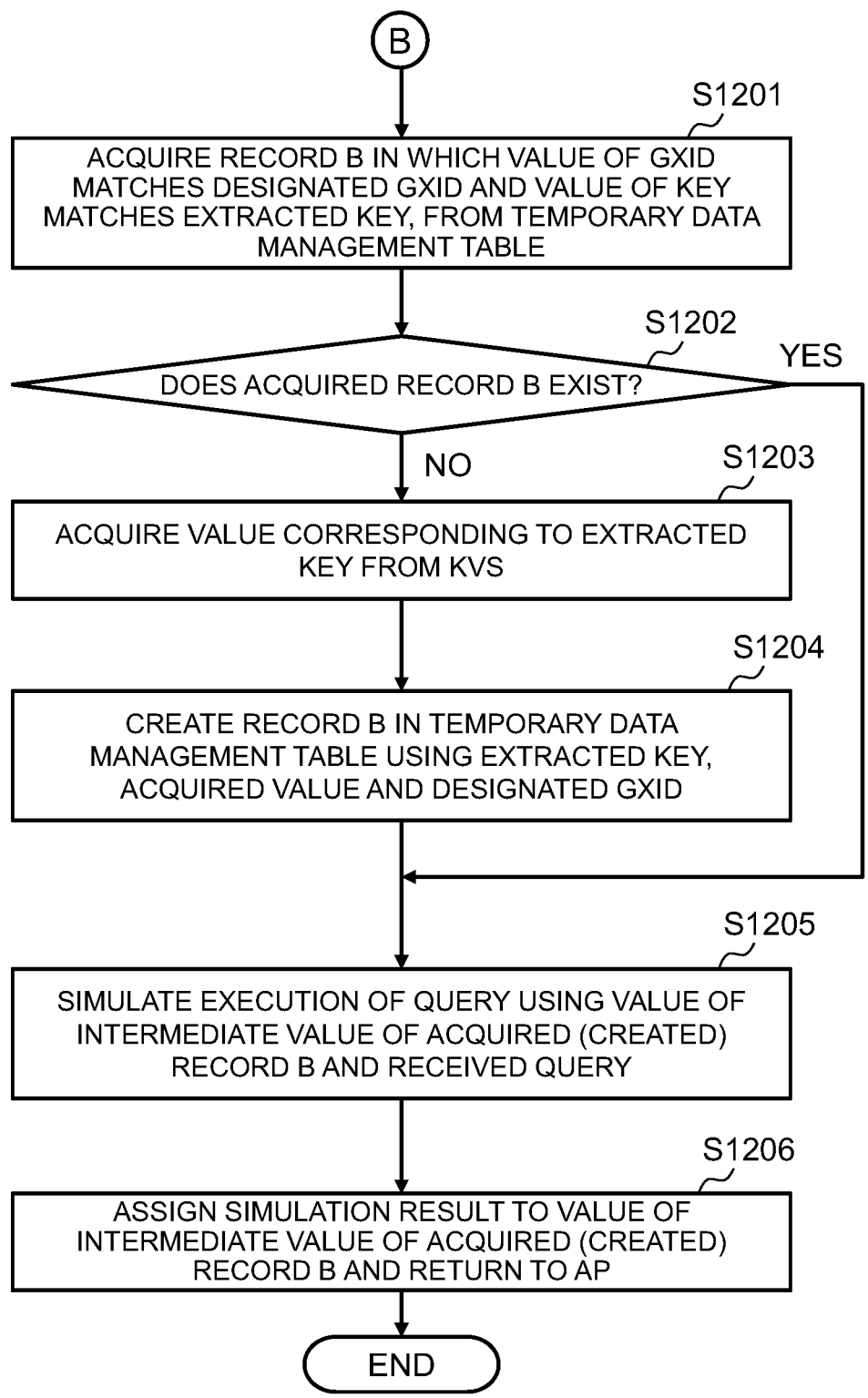
FIG. 17 is a flowchart indicating the processing of the AP acceptance program.

FIG. 15 to FIG. 17 are flowcharts indicating processing of the AP acceptance program 201. The AP acceptance program 201 first acquires a record A in which a value of the GXID 401 in the GXID management table 204 matches the designated GXID in step S1001. In the subsequent step S1002, the AP acceptance program 201 determines whether or not the acquired record A exists. The AP acceptance program 201 proceeds to step S1003 in a case where it is determined that the record A exists and ends the processing in FIG. 15 with error in a case where it is determined that the record A does not exist.

In step S1003, the AP acceptance program 201 extracts a key from the received query. In the subsequent step S1004, the AP acceptance program 201 determines whether or not the key extracted in step S1003 falls within a key range of the coupled KVS 160. The AP acceptance program 201 proceeds to step S1005 in a case where it is determined that the key falls within the key range and ends the processing in FIG. 15 with error in a case where it is determined that the key does not fall within the key range.

In step S1005, the AP acceptance program 201 starts exclusion control. In the subsequent step S1006, the AP acceptance program 201 performs lock management table update processing which will be described in detail in FIG. 27. In the subsequent step S1007, the AP acceptance program 201 generates a sequence number. In the subsequent step S1008, the AP acceptance program 201 adds a new record to the query management table 209 using the sequence number generated in step S1007 and the received query and GXID.

In the subsequent step S1009, the AP acceptance program 201 ends the exclusion control. In the subsequent step S1010, the AP acceptance program 201 determines whether or not the coupled KVS 160 has the transaction control function. The TM acceptance program 206 proceeds to step S1101 in FIG. 16 by way of circled A in a case where it is determined that the coupled KVS 160 has the transaction control function and proceeds to step S1201 in FIG. 17 by way of circled B in a case where it is determined that the coupled KVS 160 does not have the transaction control function.

In step S1101 in FIG. 16, the AP acceptance program 201 determines whether or not a value of the LX state 403 in the record A acquired in step S1001 in FIG. 15 is "normal". The AP acceptance program 201 proceeds to step S1102 in a case where it is determined that the value of the LX state 403 is "normal" and proceeds to step S1104 in a case where it is determined that the value of the LX state 403 is not "normal". In step S1102, the AP acceptance program 201 restarts a transaction corresponding to a value of the LXID 402 of the acquired record A. In the subsequent step S1103, the AP acceptance program 201 causes the restarted transaction to execute the received query and returns the result to the AP 110. In step S1104, the AP acceptance program 201 stands by for a fixed period and returns to step S1101.

In step S1201 in FIG. 17, the AP acceptance program 201 acquires a record in which a value of the GXID 702 in the temporary data management table 215 matches the designated GXID and a value of the key 701 matches the extracted key. In the subsequent step S1202, the AP acceptance program 201 determines whether or not the record B acquired in step S1201 exists. The AP acceptance program 201 proceeds to step S1205 in a case where it is determined that the acquired record exists and proceeds to step S1203 in a case where it is determined that the acquired record does not exist.

In step S1203, the AP acceptance program 201 acquires a value corresponding to the key extracted in step S1003 from the KVS 160. In the subsequent step S1204, the AP acceptance program 201 generates a record B in the temporary data management table 215 using the key extracted in step S1003, the value acquired in step S1203 and the designated GXID and proceeds to step S1205. However, the value acquired in step S1203 is used as a value common between the initial value 703 and the intermediate value 704.

In the subsequent step S1205, the AP acceptance program 201 simulates execution of the query using a value of the intermediate value 704 of the acquired or created record B and the received query. In the subsequent step S1206, the AP acceptance program 201 assigns a simulation result in step S1205 to the intermediate value 704 of the record B in the temporary data management table 215, returns an execution result (the intermediate value 704 in a case of a read query, whether or not to update in a case of write query, or the like) of the query to the AP 110 and ends the processing indicated in FIG. 17.

Figure 18:
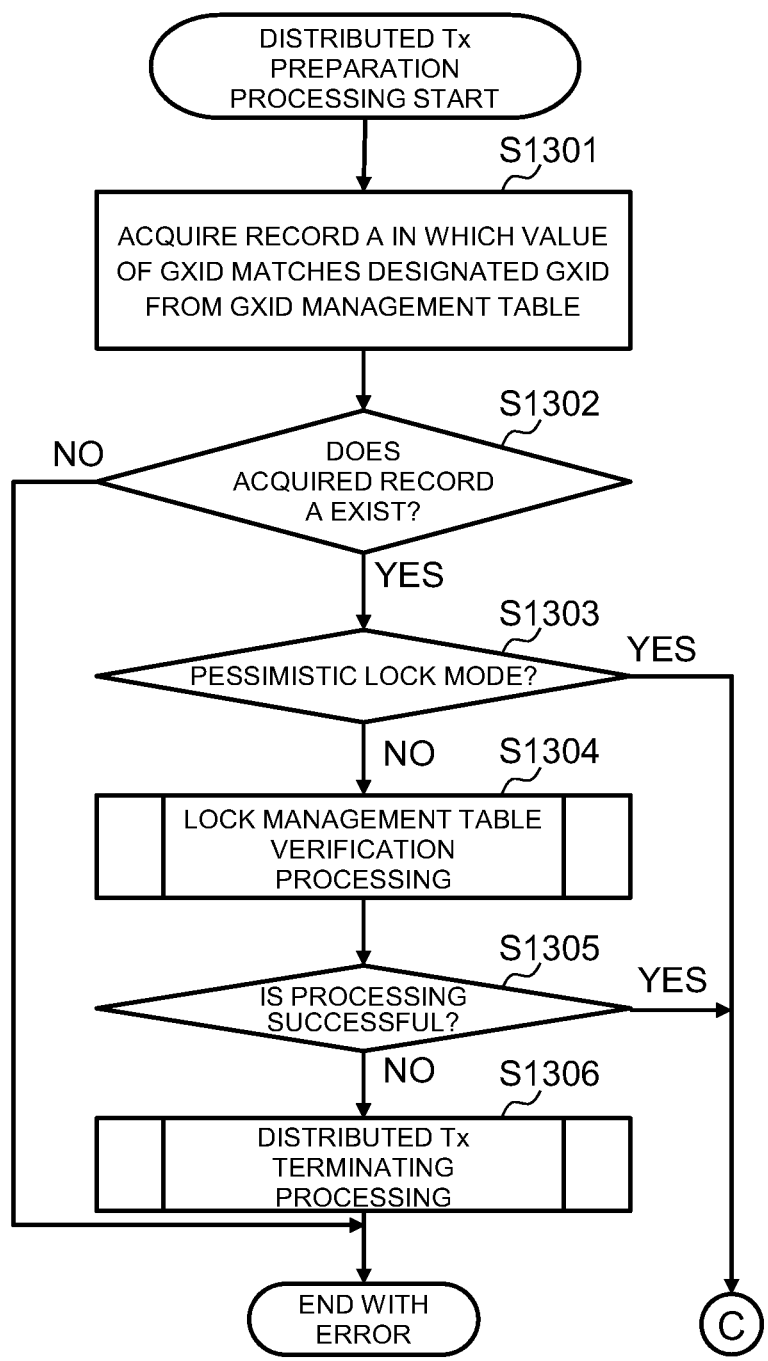
FIG. 18 is a flowchart indicating distributed Tx preparation processing.

FIG. 18 is a flowchart indicating distributed Tx preparation processing to be executed by the TM acceptance program 206. FIG. 18 can be also regarded as indicating detailed processing of step S703 in FIG. 12. The TM acceptance program 206 first acquires a record A in which a value of the GXID 401 in the GXID management table 204 matches the designated GXID in step S1301. In the subsequent step S1302, the TM acceptance program 206 determines whether or not the record A acquired in step S1301 exists. The TM acceptance program 206 proceeds to step S1303 in a case where it is determined that the acquired record exists and ends the processing in FIG. 18 with error in a case where it is determined that the acquired record does not exist.

Figure 19:
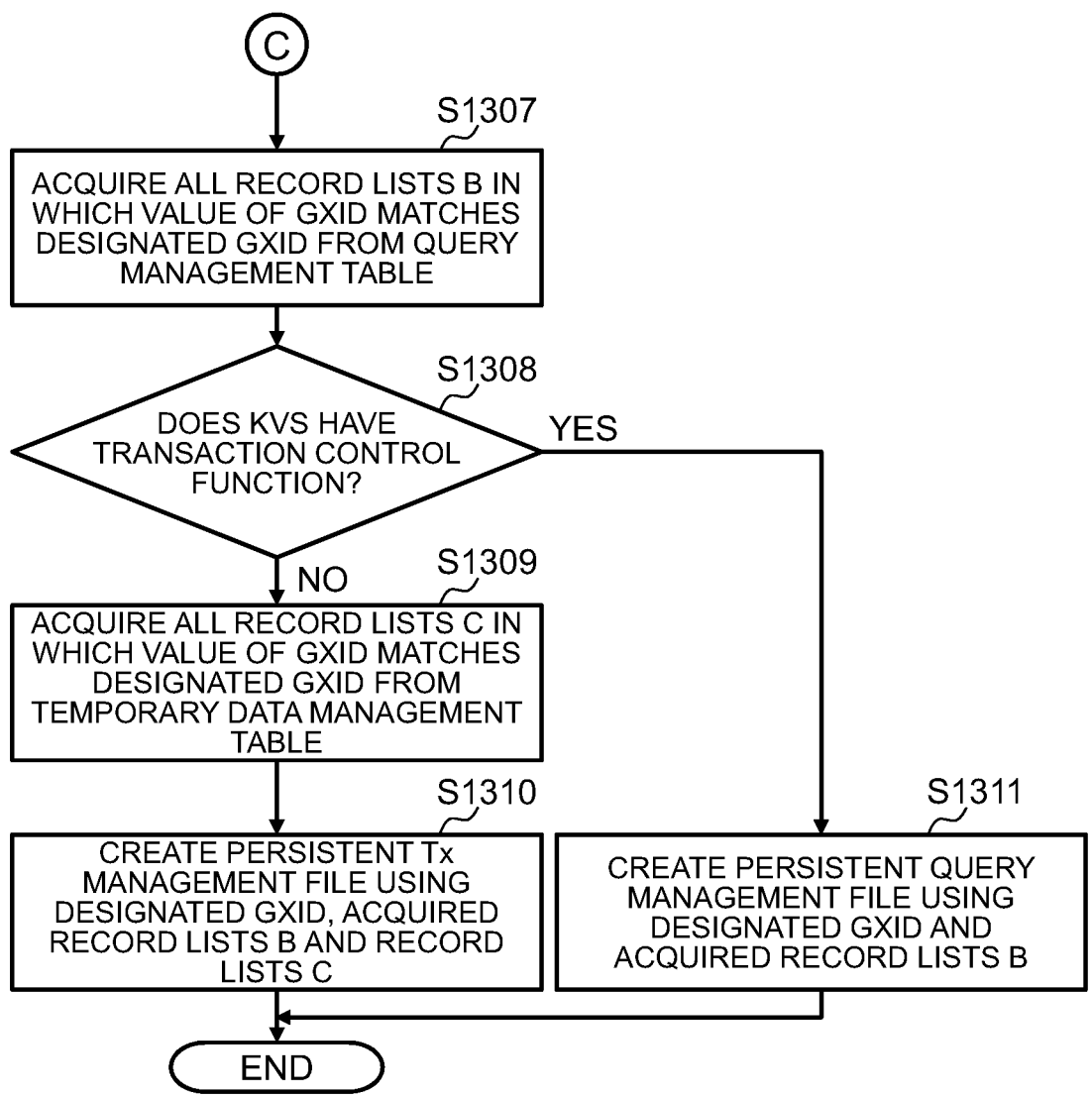
FIG. 19 is a flowchart indicating the distributed Tx preparation processing.

In step S1303, the TM acceptance program 206 determines whether or not pessimistic lock is employed in the exclusion control and proceeds to step S1307 in FIG. 19 by way of circled C in a case where it is determined that pessimistic lock is employed. The TM acceptance program 206 proceeds to step S1304 in a case where it is determined that pessimistic lock is not employed, that is, optimistic lock is employed in the exclusion control. In step S1304, the TM acceptance program 206 executes lock management table verification processing which will be indicated in detail in FIG. 30. In the subsequent step S1305, the TM acceptance program 206 determines whether or not the processing in the immediately preceding step has been successful.

As will be described later, end of the lock management table verification processing includes end with error and normal end, and normal end means that the lock management table verification processing has been successful. The TM acceptance program 206 proceeds to step S1307 in FIG. 19 by way of circled C in a case where it is determined that the lock management table verification processing has been successful and proceeds to step S1306 in a case where it is determined that the lock management table verification processing has failed. In step S1306, the TM acceptance program 206 executes the distributed Tx terminating processing indicated in detail in FIG. 13 and ends the processing in FIG. 18 with error.

Description will be continued with reference to FIG. 19. In step S1307 in FIG. 19 to which the processing transitions by way of circled C, the TM acceptance program 206 acquires all records B in which a value of the GXID 602 in the query management table 209 matches the designated GXID. In the subsequent step S1308, the TM acceptance program 206 determines whether or not the KVS 160 coupled to the RM adapter 150 that is executing the program has the transaction control function. The TM acceptance program 206 proceeds to step S1311 in a case where it is determined that the coupled KVS 160 has the transaction control function and proceeds to step S1309 in a case where it is determined that the coupled KVS 160 does not have the transaction control function.

In step S1309, the TM acceptance program 206 acquires all records C in which a value of the GXID 702 in the temporary data management table 215 matches the designated GXID. In the subsequent step S1310, the TM acceptance program 206 creates the persistent Tx management file 216 using the designated GXID, the acquired record B and the acquired record C and ends the processing indicated in FIG. 19. In step S1311, the TM acceptance program 206 creates the persistent query management file 212 using the designated GXID and the acquired record B and ends the processing indicated in FIG. 19.

Figure 20:
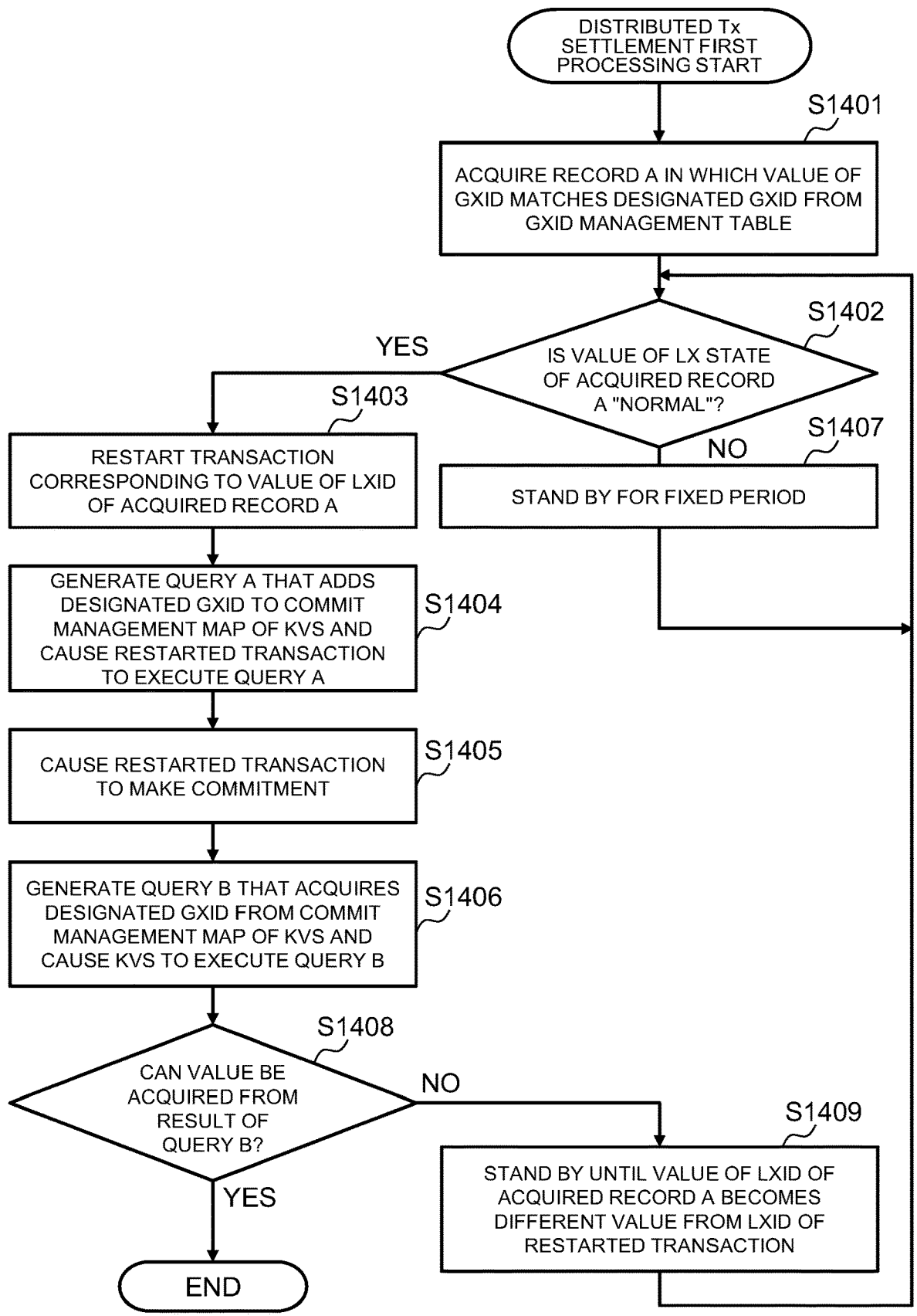
FIG. 20 is a flowchart indicating distributed Tx settlement first processing.

FIG. 20 is a flowchart indicating distributed Tx settlement first processing to be executed by the TM acceptance program 206. FIG. 20 can be also regarded as indicating detailed processing of step S707 in FIG. 12. The TM acceptance program 206 first acquires a record A in which a value of the GXID 401 in the GXID management table 204 matches the designated GXID in step S1401. In the subsequent step S1402, the TM acceptance program 206 determines whether or not a value of the LX state 403 of the acquired record A is "normal". The TM acceptance program 206 proceeds to step S1403 in a case where it is determined that the value of the LX state 403 is "normal" and proceeds to step S1407 in a case where it is determined that the value of the LX state 403 is not "normal".

In step S1407, the TM acceptance program 206 stands by for a fixed period and returns to step S1402. In step S1403, the TM acceptance program 206 restarts a transaction corresponding to a value of the LXID 402 of the acquired record A. In the subsequent step S1404, the TM acceptance program 206 generates a query A that adds the designated GXID to the commit management map 221 of the KVS 160 and causes the restarted transaction to execute the query A. In the subsequent step S1405, the TM acceptance program 206 commits the restarted transaction. In the subsequent step S1406, the TM acceptance program 206 generates a query B that acquires the designated GXID from the commit management map 221 of the KVS 160 and causes the KVS 160 to execute the query B.

In the subsequent step S1408, the TM acceptance program 206 determines whether or not a value could be acquired from a result of the query B executed in step S1406. The TM acceptance program 206 ends the processing in FIG. 20 in a case where it is determined that the value could be acquired and proceeds to step S1409 in a case where it is determined that the value could not be acquired. In step S1409, the TM acceptance program 206 stands by until the value of the LXID 402 of the acquired record A becomes a value different from the value of the LXID of the restarted transaction and returns to step S1402. In other words, the TM acceptance program 206 continues the processing in step S1409 while the value of the LXID 402 of the acquired record A is the same as the value of the LXID of the restarted transaction.

Figure 21:
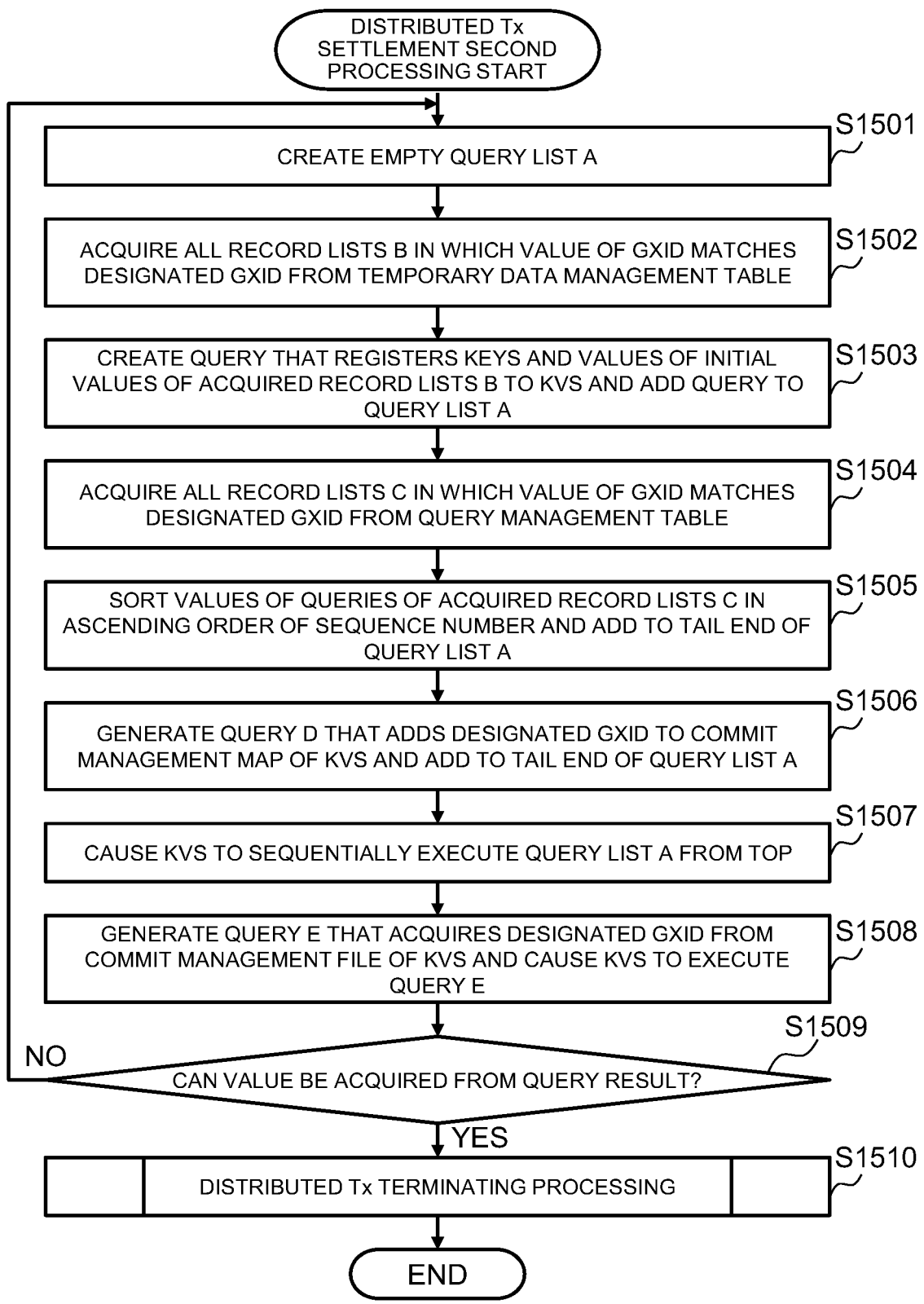
FIG. 21 is a flowchart indicating distributed Tx settlement second processing.

FIG. 21 is a flowchart indicating distributed Tx settlement second processing to be executed by the TM acceptance program 206. FIG. 21 can be also regarded as indicating detailed processing of step S706 in FIG. 12. The TM acceptance program 206 first creates an empty query list A in step S1501. In the subsequent step S1502, the TM acceptance program 206 acquires all records B in which the value of the GXID 702 in the temporary data management table 215 matches the designated GXID.

In the subsequent step S1503, the TM acceptance program 206 creates a query that registers the keys 701 of all the acquired records B and the value of the initial value 703 in the KVS 160 and adds the query to the query list A. In the subsequent step S1504, the TM acceptance program 206 acquires all records C in which the value of the GXID 602 in the query management table 209 matches the designated GXID. In the subsequent step S1505, the TM acceptance program 206 sorts the values of the queries 603 of all the acquired records C in ascending order of the sequence numbers 601 and adds the queries 603 to the tail end of the query list A.

In the subsequent step S1506, the TM acceptance program 206 generates a query D that adds the designated GXID to the commit management map 221 of the KVS 160 and adds the query D to the tail end of the query list A. In the subsequent step S1507, the TM acceptance program 206 causes the coupled KVS 160 to sequentially execute the query list A from the head. In the subsequent step S1508, the TM acceptance program 206 generates a query E that acquires the designated GXID from the commit management map 221 of the KVS 160 and causes the KVS 160 to execute the query E.

In the subsequent step S1509, the TM acceptance program 206 determines whether or not the value could be acquired from the result of the query executed in step S1508. The TM acceptance program 206 proceeds to step S1510 in a case where it is determined that the value could be acquired and returns to step S1501 in a case where it is determined that the value could not be acquired. In step S1510, the TM acceptance program 206 executes the distributed Tx terminating processing and ends the processing indicated in FIG. 21.

Figure 22:
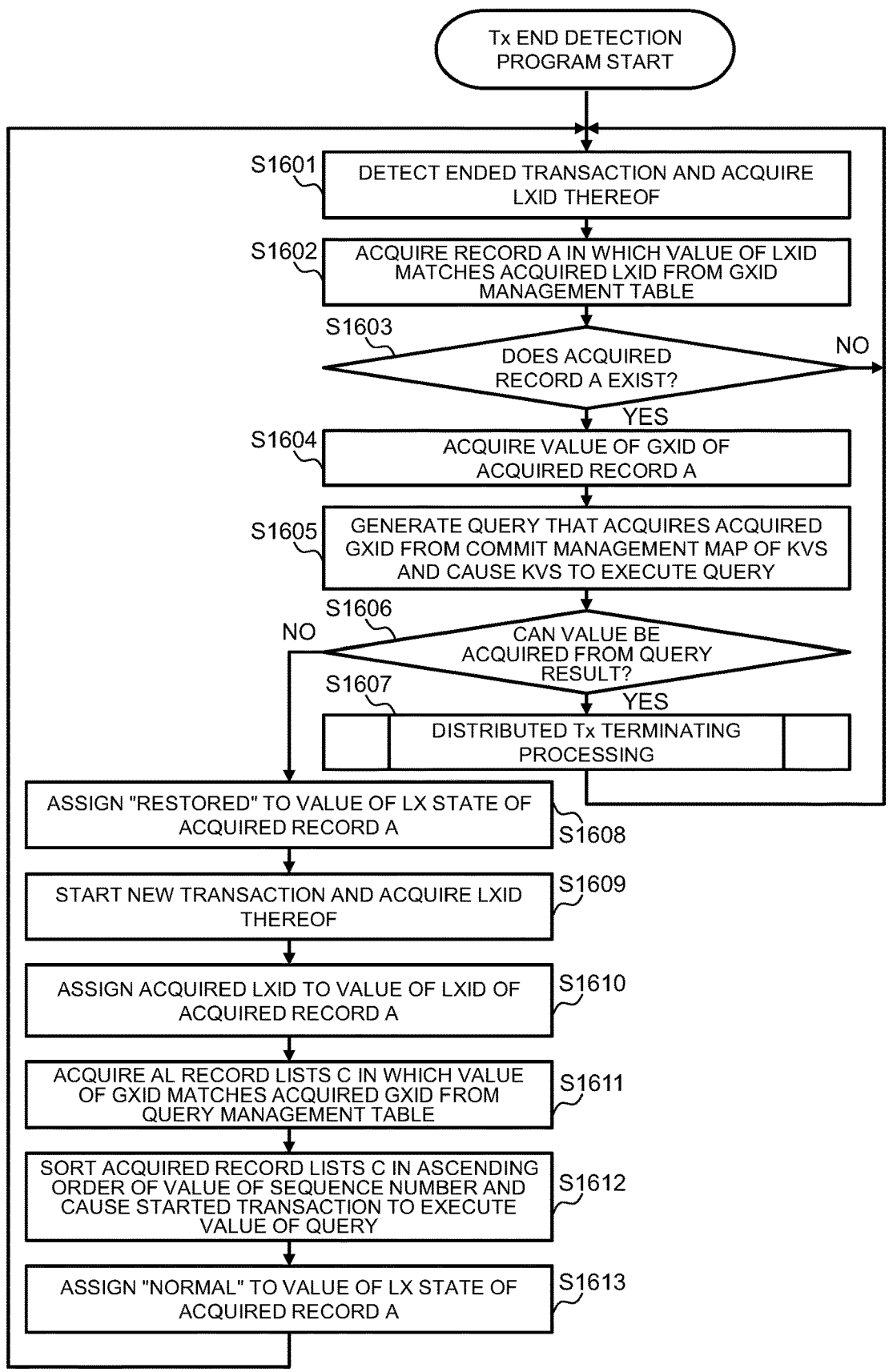
FIG. 22 is a flowchart indicating processing of a Tx end detection program.

FIG. 22 is a flowchart indicating processing of the Tx end detection program 202. The Tx end detection program 202 is started when the RM adapter 150 is started and forcibly terminated when the RM adapter 150 is shut down. In other words, the Tx end detection program 202 is a program that is constantly executed. The Tx end detection program 202 first detects the ended transaction and acquires the LXID of the transaction in step S1601. In the subsequent step S1602, the Tx end detection program 202 acquires a record A in which the value of the LXID 402 in the GXID management table 204 matches the LXID acquired in step S1601.

In the subsequent step S1603, the Tx end detection program 202 determines whether or not the record A acquired in step S1602 exists. The Tx end detection program 202 proceeds to step S1604 in a case where it is determined that the record A exists and returns to step S1601 in a case where it is determined that the record A does not exist. In step S1604, the Tx end detection program 202 acquires the value of the GXID 401 of the acquired record A.

In the subsequent step S1605, the Tx end detection program 202 generates a query that acquires the GXID acquired in step S1604 from the commit management map 221 of the KVS 160 and causes the KVS 160 to execute the query. In the subsequent step S1606, the Tx end detection program 202 determines whether or not the value could be acquired from the result of the query executed in the immediately preceding step. The Tx end detection program 202 proceeds to step S1607 in a case where it is determined that the value could be acquired and proceeds to step S1608 in a case where it is determined that the value could not be acquired.

In step S1607, the Tx end detection program 202 executes distributed Tx terminating processing and returns to step S1601. In step S1608, the Tx end detection program 202 assigns "restored" to the LX state 403 of the record A acquired in step S1602. In the subsequent step S1609, the Tx end detection program 202 starts a new transaction and acquires an LXID of the transaction. In the subsequent step S1610, the Tx end detection program 202 assigns the LXID acquired in step S1609 to the LXID 402 of the record A acquired in step S1602.

In the subsequent step S1611, the Tx end detection program 202 acquires all records C in which the value of the GXID 602 in the query management table 209 matches the GXID acquired in step S1604. In the subsequent step S1602, the Tx end detection program 202 sorts the acquired records C in ascending order of values in a sequence number column and causes the restarted transaction to execute the respective queries 603. In the subsequent step S1613, the Tx end detection program 202 assigns "normal" to the value of the LX state 403 of the record A acquired in step S1602 and returns to step S1601.

Figure 23:
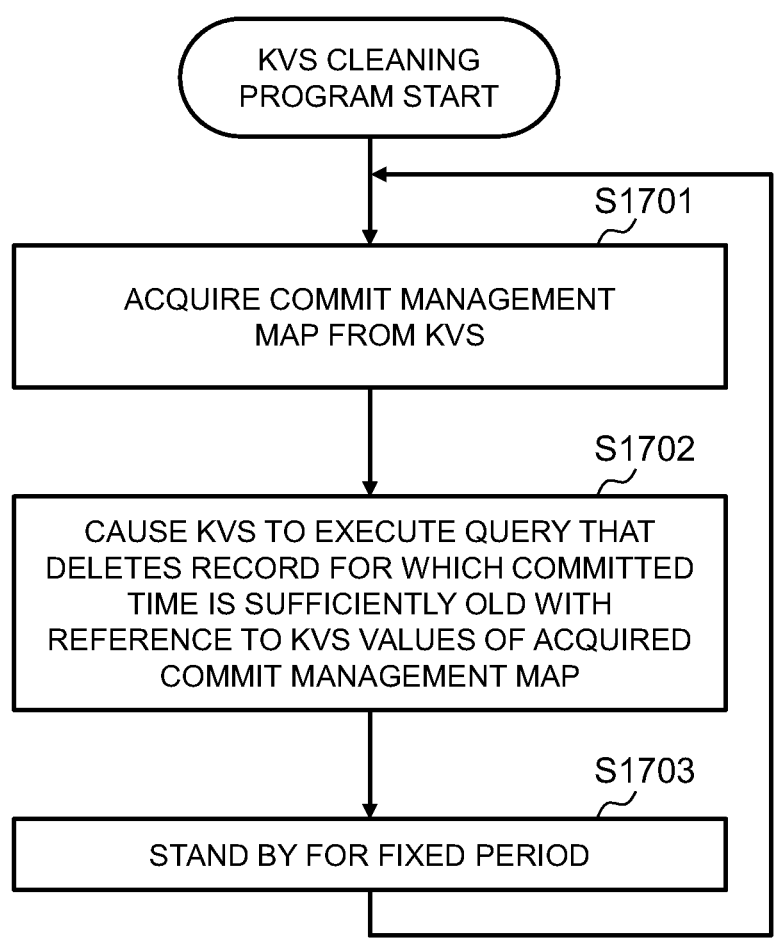
FIG. 23 is a flowchart indicating processing of a KVS cleaning program.

FIG. 23 is a flowchart indicating processing of the KVS cleaning program 207. The KVS cleaning program 207 is executed when the RM adapter 150 is started and forcibly terminated when the RM adapter 150 is shut down. In other words, the KVS cleaning program 207 is constantly running. First, in step S1701, the KVS cleaning program 207 acquires the commit management map 221 from the coupled KVS 160.

In the subsequent step S1702, the KVS cleaning program 207 generates a query that extracts committed time at which each record has been committed with reference to the KVS value 802 in the acquired commit management map 221 and deletes records for which the committed time is sufficiently old and causes the KVS 160 to execute the query. The records for which the committed time is sufficiently old are deleted because they are unnecessary for restoration. The committed time being sufficiently old means that the committed time is, for example, one hour or more ago from current time. In the subsequent step S1703, the KVS cleaning program 207 stands by for a fixed period and returns to step S1701.

Figure 24:
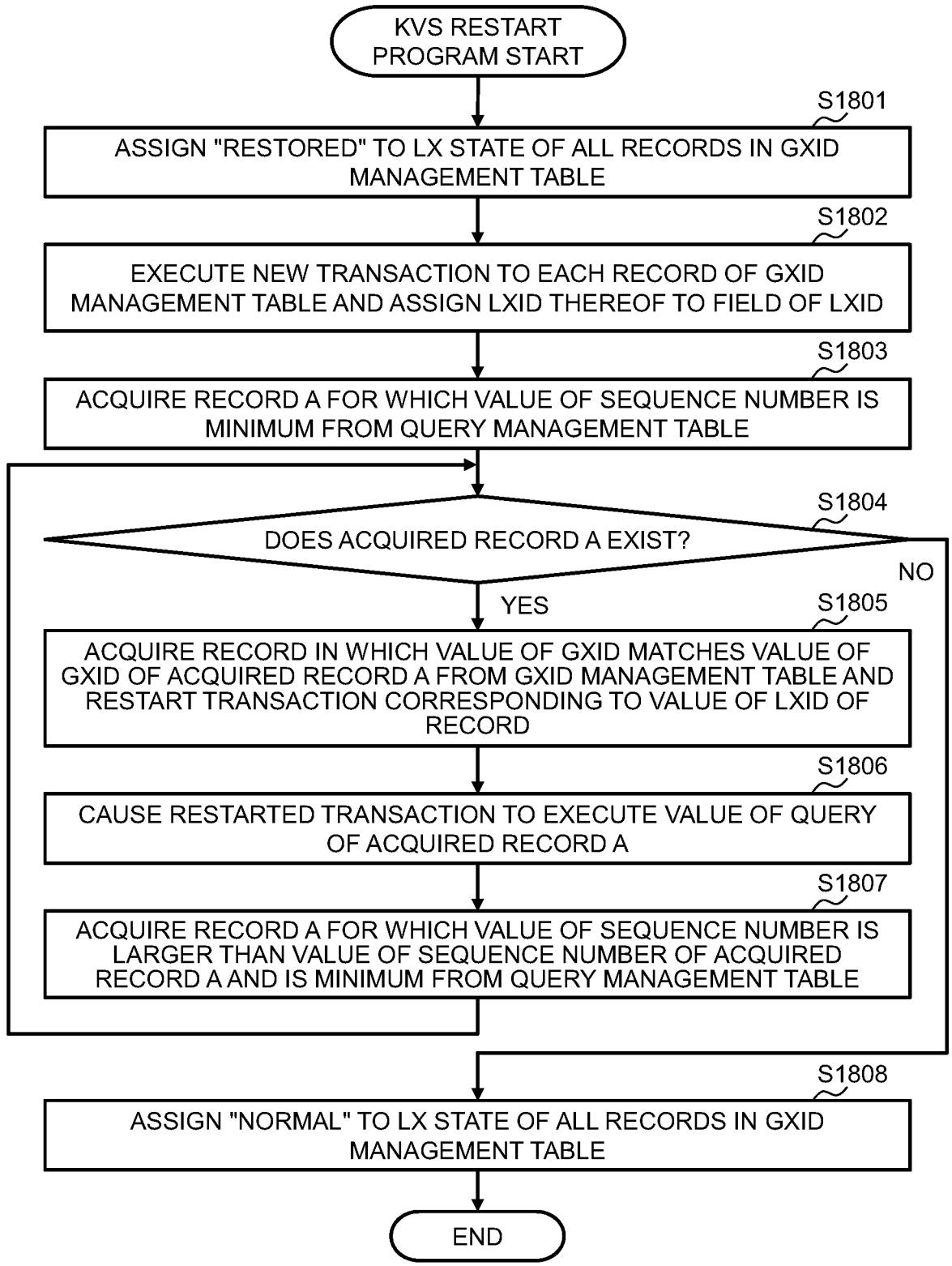
FIG. 24 is a flowchart indicating processing of a KVS restart program.

FIG. 24 is a flowchart indicating processing of the KVS restart program 208. The KVS restart program 208 is executed by the corresponding RM adapter 150 if one of the KVSs 160 is restored from down. For example, if the first KVS 160-1 is restored from down, the first RM adapter 150-1 executes the KVS restart program 208.

The KVS restart program 208 first assigns "restored" to the LX states 403 of all the records in the GXID management table 204 in step S1801. In the subsequent step S1802, the KVS restart program 208 executes a new transaction on each record in the GXID management table 204 and assigns the LXID thereof to the LXID 402. In the example indicated in FIG. 34, two records are stored in the GXID management table 204, and thus, a total of two transactions are started in S504 and S506.

In the subsequent step S1803, the KVS restart program 208 acquires a record A whose value in the sequence number column is minimum from the query management table 209 and proceeds to step S1804. In step S1804, the KVS restart program 208 determines whether or not the acquired record A exists. The KVS restart program 208 proceeds to step S1805 in a case where it is determined that the record A exists and proceeds to step S1808 in a case where it is determined that the record A does not exist.

In step S1805, the KVS restart program 208 specifies a record in which the GXID 401 matches the value of the GXID 602 of the acquired record A from the GXID management table 204 and restarts a transaction corresponding to the value of the LXID 402 of the specified record. In the subsequent step S1806, the KVS restart program 208 causes the restarted transaction to execute the value of the query 603 of the acquired record A. In the subsequent step S1807, the KVS restart program 208 acquires a record A whose value in the sequence number column is larger than a value of the sequence number 601 of the acquired record A and is minimum from the query management table 209 and returns to step S1804. In step S1808 executed in a case where a negative determination result is obtained in step S1804, the KVS restart program 208 assigns "normal" to the LX states 403 of all the records in the GXID management table 204 and ends the processing indicated in FIG. 24.

Figure 25:
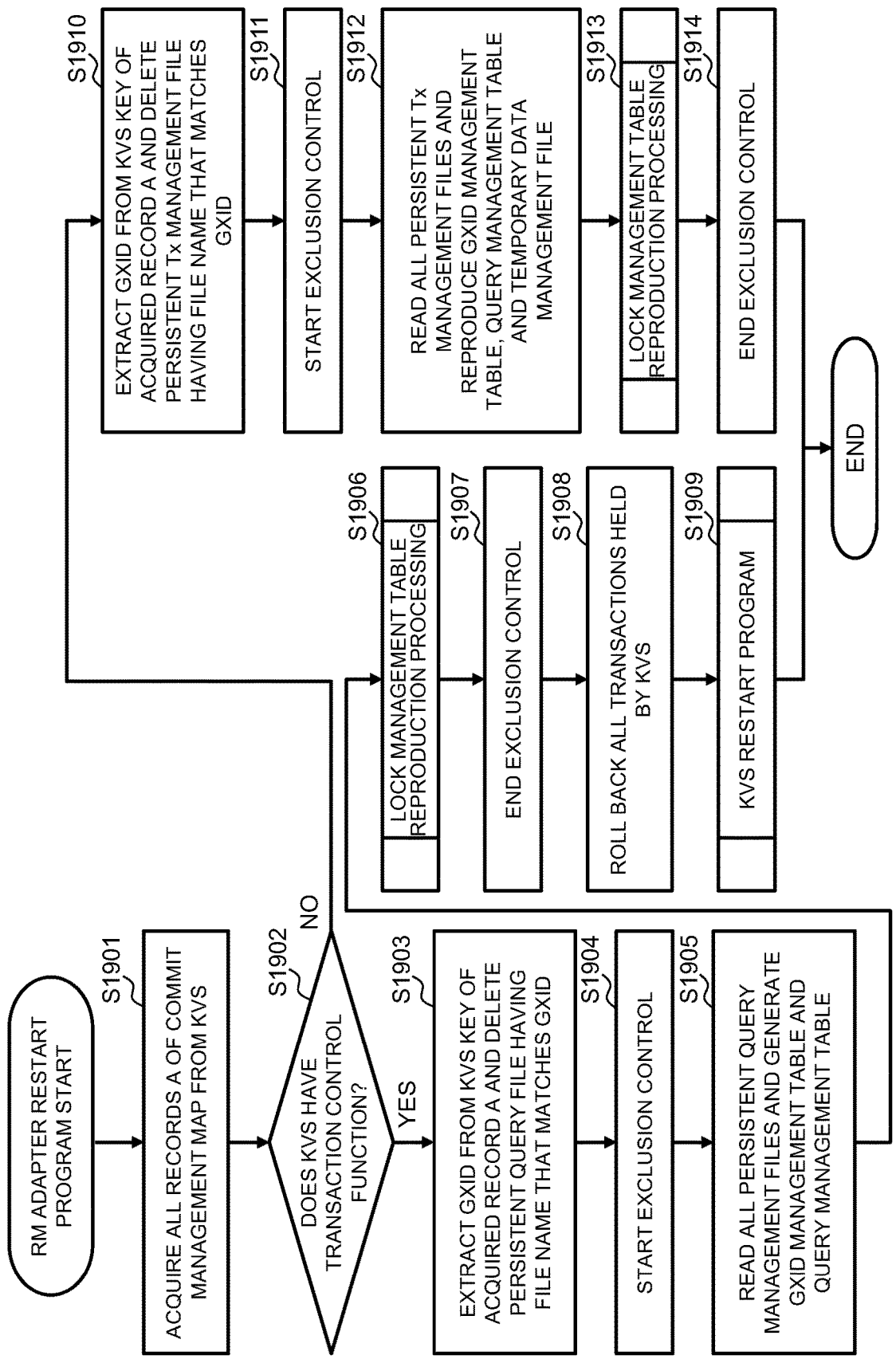
FIG. 25 is a flowchart indicating processing of an RM adapter restart program.

FIG. 25 is a flowchart indicating processing of the RM adapter restart program 203. The RM adapter restart program 203 is started when the corresponding RM adapter 150 is restored from down. For example, if the first RM adapter 150-1 is restored from down, the RM adapter restart program 203 is started in the first RM adapter 150-1.

The RM adapter restart program 203 first acquires all record lists A of the commit management map 221 by the coupled KVS 160 in step S1901. In the subsequent step S1902, the RM adapter restart program 203 determines whether or not the KVS 160 coupled to the RM adapter 150 that is executing the program has the transaction control function. The RM adapter restart program 203 proceeds to step S1903 in a case where it is determined that the coupled KVS 160 has the transaction control function and proceeds to step S1910 in a case where it is determined that the coupled KVS 160 does not have the transaction control function.

In step S1903, the RM adapter restart program 203 extracts a GXID from the KVS keys 801 of all the acquired records A and deletes the persistent query management file 212 having a file name that matches the GXID. In the subsequent step S1904, the RM adapter restart program 203 reads all the persistent query management files 212 not deleted in step S1903 and generates the GXID management table 204 and the query management table 209. However, in the GXID management table 204 generated in this event, the LXID 402 is "-", and the LX state 403 is "restored".

In the subsequent step S1906, the RM adapter restart program 203 executes lock management table reproduction processing. In the subsequent step S1907, the RM adapter restart program 203 ends the exclusion control. In the subsequent step S1908, the RM adapter restart program 203 rolls back all the transactions stored in the KVS 160. In the subsequent step S1909, the RM adapter restart program 203 starts execution of the KVS restart program 208 and ends the processing indicated in FIG. 25.

In step S1910 that is executed in a case where a negative determination result is obtained in step S1902, the RM adapter restart program 203 extracts a GXID from the KVS keys 801 of all the acquired records A and deletes the persistent Tx management file 216 having a file name that matches the GXID. In the subsequent step S1911, the RM adapter restart program 203 starts exclusion control.

In the subsequent step S1912, the RM adapter restart program 203 reads all the persistent Tx management files 216 that are not deleted in step S1910 and generates the GXID management table 204, the query management table 209 and the temporary data management table 215. However, in the GXID management table 204 generated in this event, the LXID 402 is "-", and the LX state 403 is "normal". Further, the intermediate value 704 of the temporary data management table 215 generated in this event is "-".

In the subsequent step S1913, the RM adapter restart program 203 performs lock management table reproduction processing. In the subsequent step S1914, the RM adapter restart program 203 ends the exclusion control and ends the processing indicated in FIG. 25.

Figure 26:
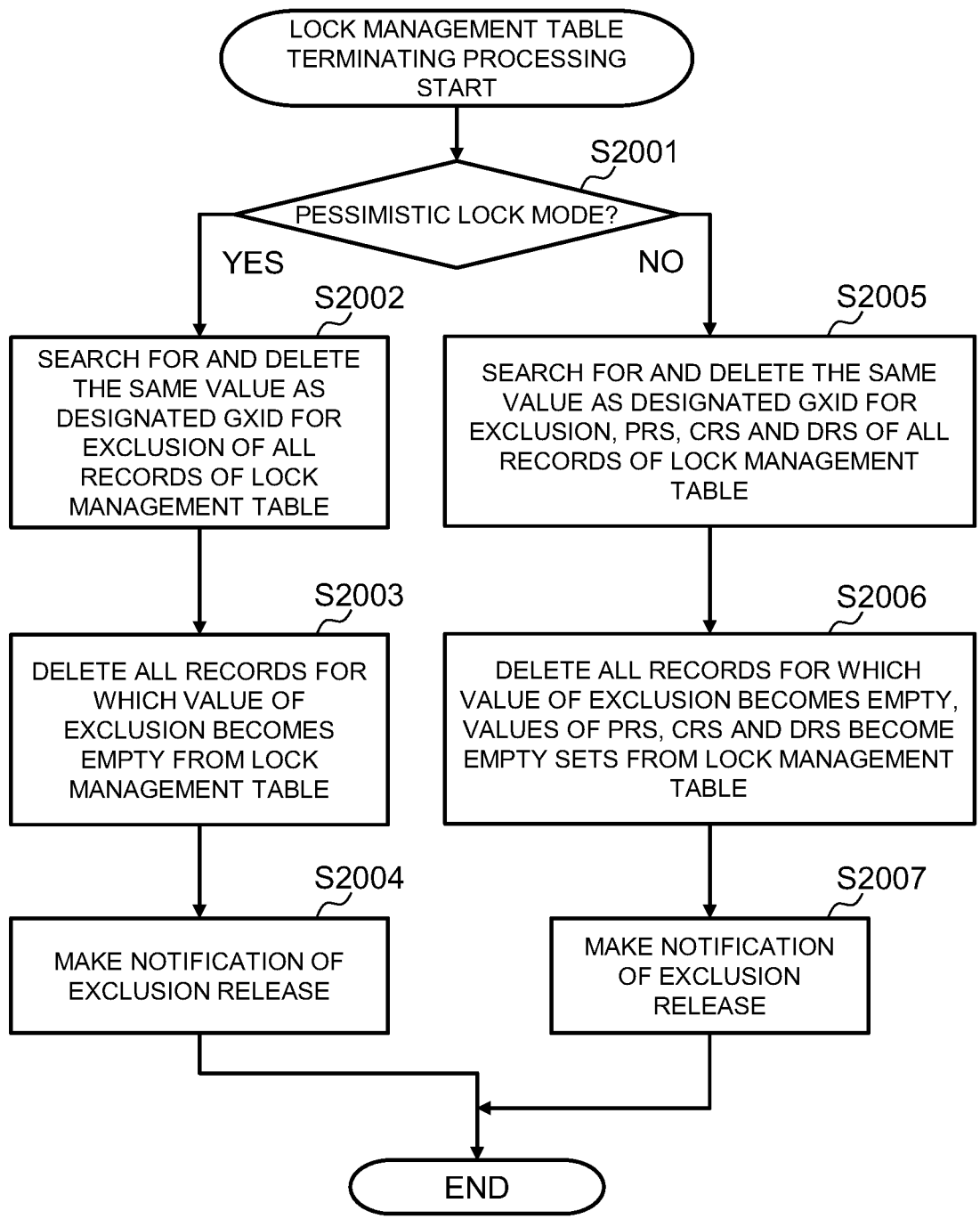
FIG. 26 is a flowchart indicating lock management table terminating processing.

FIG. 26 is a flowchart indicating lock management table terminating processing. FIG. 26 can be also regarded as indicating detailed processing of step S803 in FIG. 13. The present processing is mainly performed by the TM acceptance program 206 in a similar manner to FIG. 13. The TM acceptance program 206 first determines whether or not pessimistic lock is employed in the exclusion control in step S2001 and proceeds to step S2002 in a case where it is determined that pessimistic lock is employed. The TM acceptance program 206 proceeds to step S2005 in a case where it is determined that pessimistic lock is not employed, that is, optimistic lock is employed in the exclusion control.

In step S2002, the TM acceptance program 206 searches the exclusions 502 of all the records in the lock management table 205 for a value having the same value as the designated GXID and deletes the value. In the subsequent step S2003, the TM acceptance program 206 specifies all the records for which values of the exclusions 502 become empty in the lock management table 205 and deletes the specified records from the lock management table 205. In the subsequent step S2004, the TM acceptance program 206 makes a notification of exclusion release and ends the processing indicated in FIG. 26.

In step S2005, the TM acceptance program 206 searches the exclusions 502, the PRSs 503, the CRSs 504 and the DRSs 505 of all the records in the lock management table 205 for a value having the same value as the designated GXID and deletes the value. In the subsequent step S2006, the TM acceptance program 206 specifies all the records for which values of the exclusions 502 become empty and values of the PRSs 503, the CRSs 504 and the DRSs 505 become an empty set in the lock management table 205 and deletes the specified records from the lock management table 205. In the subsequent step S2007, the TM acceptance program 206 makes a notification of exclusion release and ends the processing indicated in FIG. 26.

Note that while in the present flowchart, processing is made different in accordance with whether or not the mode is the pessimistic lock mode in step S2001, the processing from step S2005 to S2007 may be performed without determination in step S2001 being performed, because the processing from step S2002 to S2004 is included in the processing from step S2005 to S2007.

Figure 27:
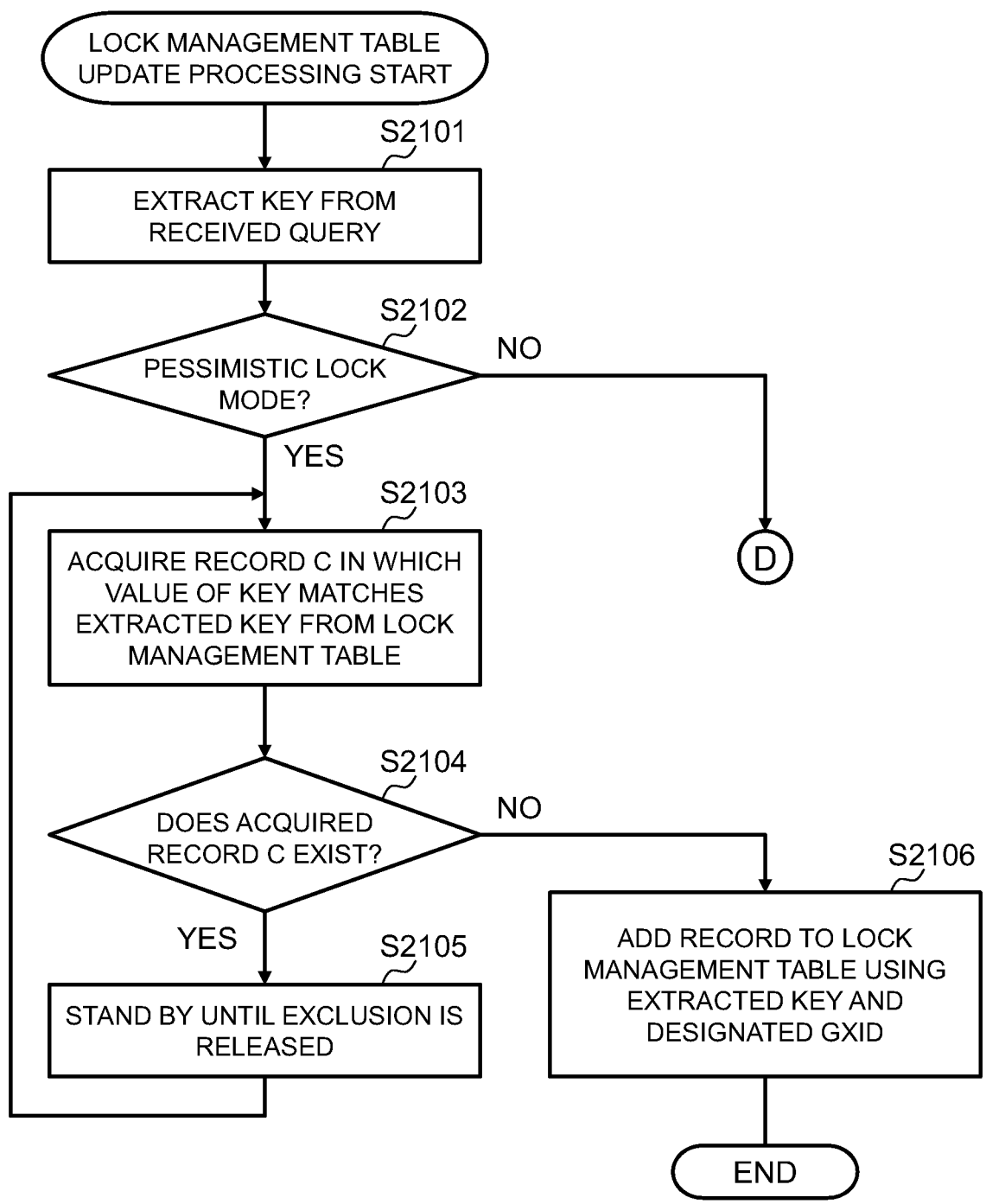
FIG. 27 is a flowchart indicating lock management table update processing.

FIG. 27 is a flowchart indicating lock management table update processing. FIG. 27 can be also regarded as indicating detailed processing of step S1006 in FIG. 15 and step S2505 in FIG. 31. While the processing indicated in FIG. 27 is mainly performed by the AP acceptance program 201 in a similar manner to FIG. 15 and the RM adapter restart program 203 in a similar manner to FIG. 31, hereinafter, description regarding the RM adapter restart program 203 will be omitted. In step S2101, the TM acceptance program 206 extracts a key from the received query. In the subsequent step S2102, the TM acceptance program 206 determines whether or not pessimistic lock is employed in the exclusion control and proceeds to step S2103 in a case where it is determined that pessimistic lock is employed. The TM acceptance program 206 proceeds to step S2201 in FIG. 28 by way of circled D in a case where it is determined that pessimistic lock is not employed, that is, optimistic lock is employed in the exclusion control.

In step S2103, the TM acceptance program 206 acquires a record C in which the value of the key 501 in the lock management table 205 matches the key extracted in step S2101. In the subsequent step S2104, the TM acceptance program 206 determines whether or not the acquired record C exists. The TM acceptance program 206 proceeds to step S2105 in a case where it is determined that the acquired record C exists, stands by until exclusion is released and returns to step S2103. In step S2106, the TM acceptance program 206 adds a record to the lock management table 205 using the key extracted in step S2101 and the designated GXID. However, in this record, the designated GXID is used in the exclusion 502.

Figure 28:
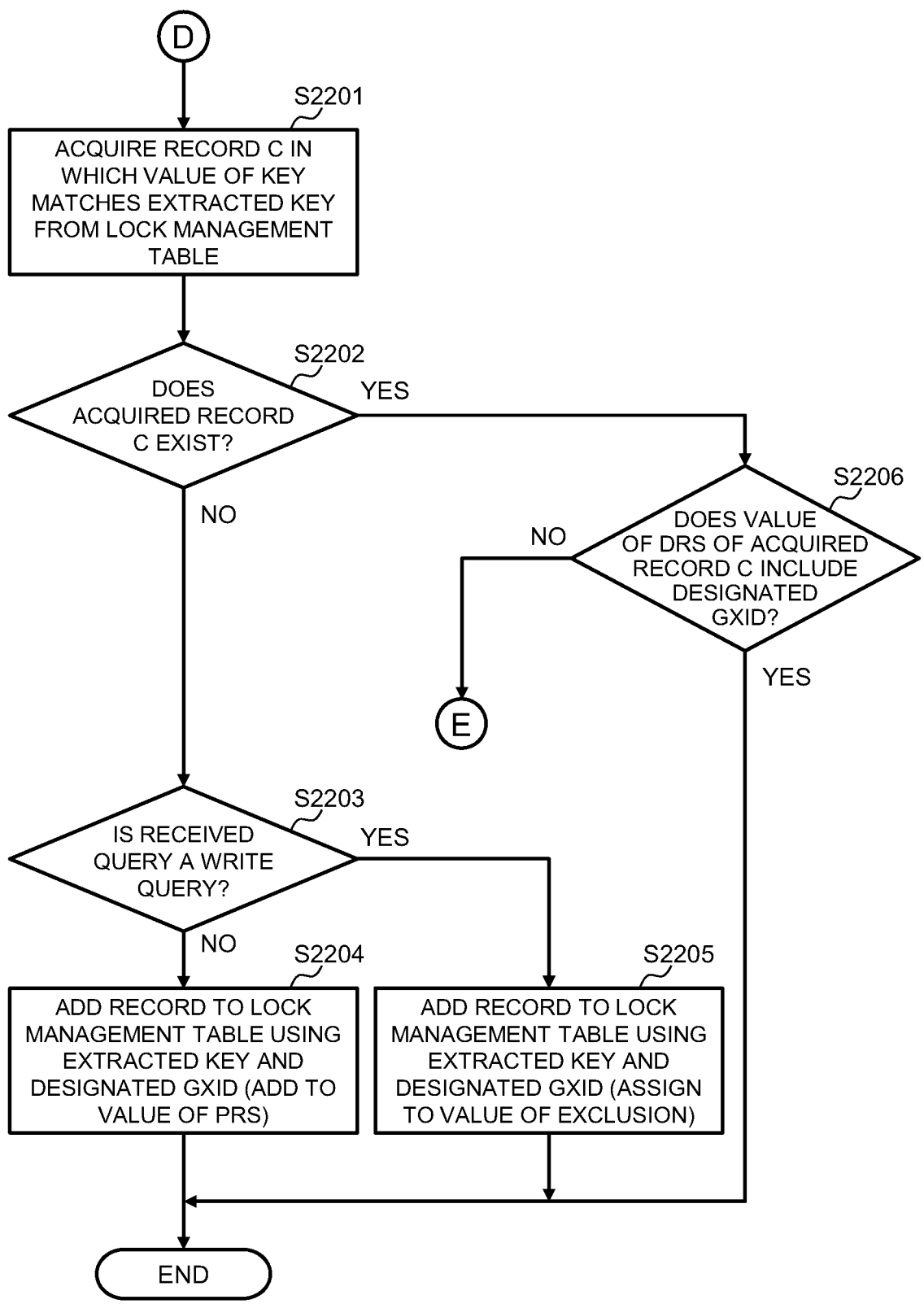
FIG. 28 is a flowchart indicating the lock management table update processing.

Description will be continued with reference to FIG. 28. In step S2201, the TM acceptance program 206 acquires a record C in which the value of the key 501 matches the key extracted in step S2101 from the lock management table 205. In the subsequent step S2202, the TM acceptance program 206 determines whether or not the record C acquired in step S2201 exists. The TM acceptance program 206 proceeds to step S2206 in a case where it is determined that the record C exists and proceeds to step S2203 in a case where it is determined that the record C does not exist.

In step S2203, the TM acceptance program 206 determines whether or not the received query is a write query. The TM acceptance program 206 proceeds to step S2205 in a case where it is determined that the received query is the write query and proceeds to step S2204 in a case where it is determined that the received query is not the write query. In step S2204, the TM acceptance program 206 adds a new record to the lock management table 205 using the key extracted in step S2101 and the designated GXID and ends the processing indicated in FIG. 28. However, in this case, the designated GXID is stored in the PRS 503. In step S2205, the TM acceptance program 206 adds a new record to the lock management table 205 using the key extracted in step S2101 and the designated GXID and ends the processing indicated in FIG. 28. However, in this case, the designated GXID is stored in the exclusion 502.

In step S2206, the TM acceptance program 206 determines whether or not the DRS 505 of the acquired record C includes the designated GXID. The TM acceptance program 206 ends the processing in FIG. 28 in a case where it is determined that the DRS 505 of the record C includes the designated GXID and proceeds to step S2301 in FIG. 29 by way of circled E in a case where it is determined that the DRS 505 of the record C does not include the designated GXID.

Figure 29:
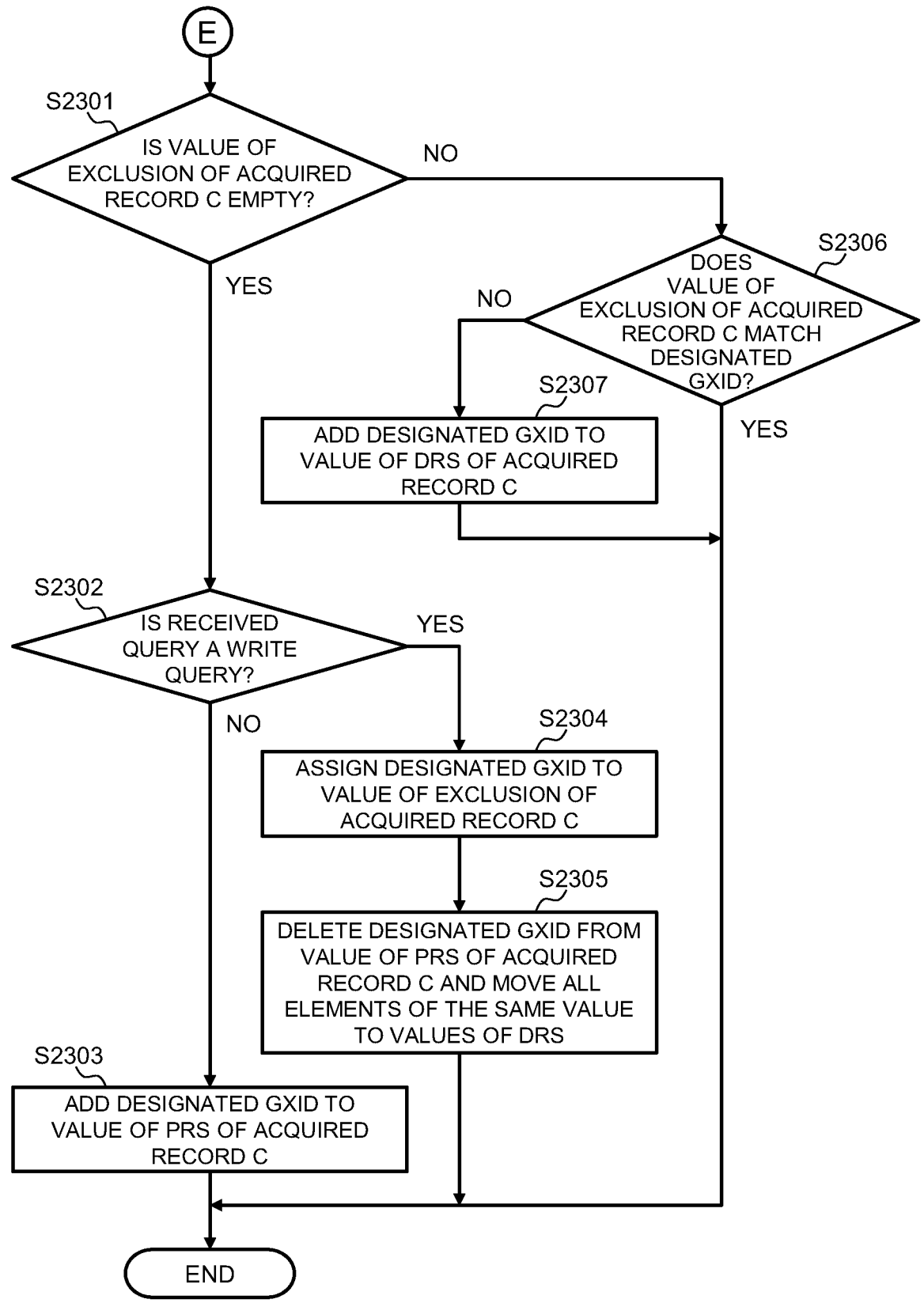
FIG. 29 is a flowchart indicating the lock management table update processing.

Description will be continued with reference to FIG. 29. In step S2301, the TM acceptance program 206 determines whether or not the value of the exclusion 502 of the acquired record C is empty. The TM acceptance program 206 proceeds to step S2302 in a case where it is determined that the value of the exclusion 502 of the acquired record C is empty and proceeds to step S2306 in a case where it is determined that the value of the exclusion 502 of the acquired record C is not empty, that is, some kind of value is stored. In step S2302, the TM acceptance program 206 determines whether or not the received query is the write query. The TM acceptance program 206 proceeds to step S2304 in a case where it is determined that the received query is the write query and proceeds to step S2303 in a case where it is determined that the received query is not the write query.

In step S2303, the TM acceptance program 206 adds the designated GXID to a field of the PRS 503 of the acquired record C and ends the processing indicated in FIG. 29. In step S2304, the TM acceptance program 206 assigns the designated GXID to a field of the exclusion 502 of the acquired record C. In the subsequent step S2305, the TM acceptance program 206 deletes the designated GXID from the field of the PRS 503 of the acquired record C, moves the deleted value of the PRS 503 to the field of the DRS 505 and ends the processing indicated in FIG. 29.

In step S2306, the TM acceptance program 206 determines whether or not the value of the exclusion 502 of the acquired record C matches the designated GXID. The TM acceptance program 206 ends the processing indicated in FIG. 29 in a case where it is determined that the value of the exclusion 502 of the acquired record C matches the designated GXID and proceeds to step S2307 in a case where it is determined that the value of the exclusion 502 of the acquired record C does not match the designated GXID. In step S2307, the TM acceptance program 206 adds the designated GXID to the field of the DRS 505 of the acquired record C and ends the processing indicated in FIG. 29.

Figure 30:
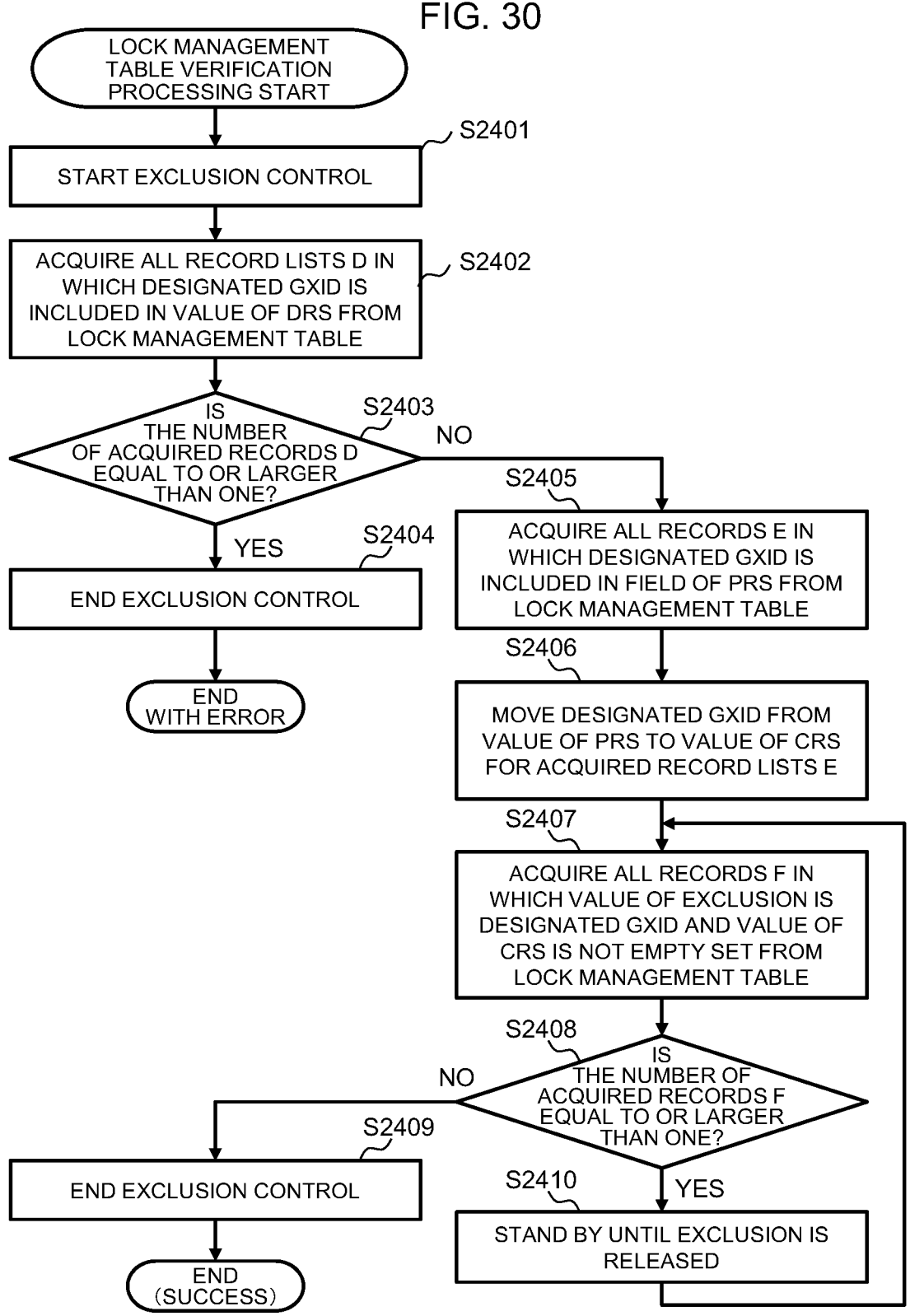
FIG. 30 is a flowchart indicating lock management table verification processing.

FIG. 30 is a flowchart indicating lock management table verification processing to be executed by the TM acceptance program 206. FIG. 30 can be also regarded as indicating detailed processing of step S1304 in FIG. 18. The TM acceptance program 206 first starts exclusion control in step S2401. In the subsequent step S2402, the TM acceptance program 206 acquires all records D including the designated GXID in the field of the DRS 505 in the lock management table 205. In the subsequent step S2403, the TM acceptance program 206 determines whether or not the number of the acquired records D is one or more. The TM acceptance program 206 proceeds to step S2404 in a case where it is determined that the number of the acquired records D is one or more and proceeds to step S2405 in a case where it is determined that the number of the acquired records D is zero. In step S2404, the TM acceptance program 206 ends the exclusion control and ends the processing indicated in FIG. 30 with error.

In step S2405, the TM acceptance program 206 acquires all records E including the designated GXID in the field of the PRS 503 in the lock management table 205. In the subsequent step S2406, the TM acceptance program 206 moves the designated GXID from the PRS 503 to the CRS 504 for the acquired records E and proceeds to step S2407. In step S2407, the TM acceptance program 206 acquires all records F in which the value of the exclusion 502 in the lock management table 205 is the designated GXID and the value of the CRS 504 is not an empty set.

In the subsequent step S2408, the TM acceptance program 206 determines whether or not the number of the acquired records F is one or more. The TM acceptance program 206 proceeds to step S2410 in a case where it is determined that the number of the acquired records F is one or more and proceeds to step S2409 in a case where the number of the acquired records F is zero. In step S2409, the TM acceptance program 206 ends the exclusion control and ends the processing indicated in FIG. 30, in other words, normally ends the processing. In step S2410, the TM acceptance program 206 stands by until exclusion is released and returns to step S2407.

Figure 31:
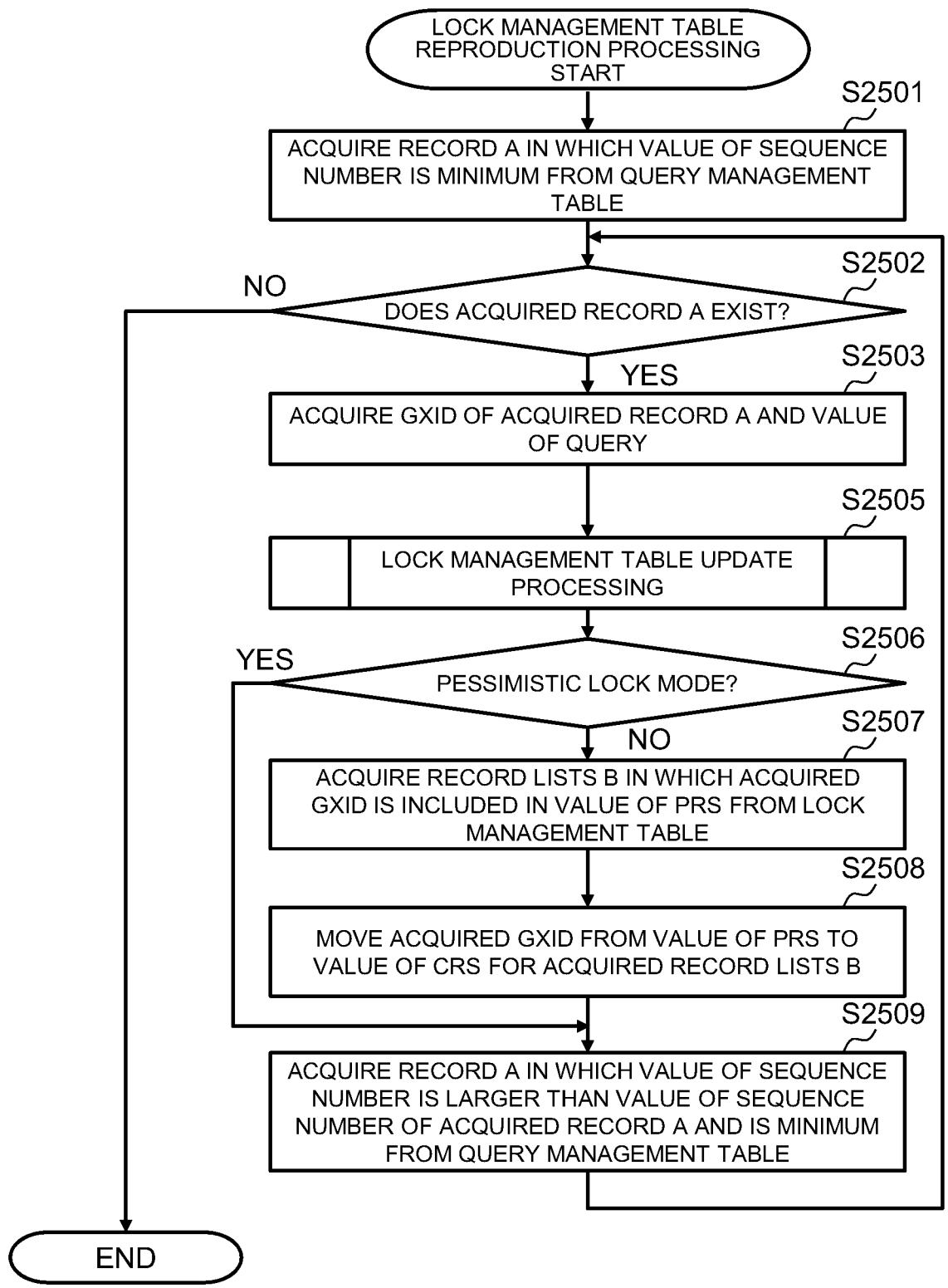
FIG. 31 is a flowchart indicating lock management table regeneration processing.

FIG. 31 is a flowchart indicating lock management table reproduction processing. FIG. 31 can be also regarded as indicating detailed processing of S1906, and the like, in FIG. 25. The lock management table reproduction processing is mainly executed by the RM adapter restart program 203. The RM adapter restart program 203 acquires a record A whose value of the sequence number 601 is minimum in the query management table 209 in step S2501. In the subsequent step S2502, the RM adapter restart program 203 determines whether or not the acquired record A exists. The RM adapter restart program 203 proceeds to step S2503 in a case where it is determined that the record A exists and ends the processing indicated in FIG. 31 in a case where it is determined that the record A does not exist.

In step S2503, the RM adapter restart program 203 acquires the GXID 602 of the acquired record A and the value of the query 603. In the subsequent step S2505, the RM adapter restart program 203 performs lock management table update processing. Note that in the lock management table update processing, the GXID acquired in step S2503 is handled as the designated GXID, and the query acquired in step S2503 is handled as the received query. In the subsequent step S2506, the RM adapter restart program 203 determines whether or not pessimistic lock is employed in the exclusion control and proceeds to step S2509 in a case where it is determined that pessimistic lock is employed. The RM adapter restart program 203 proceeds to step S2507 in a case where it is determined that pessimistic lock is not employed, that is, optimistic lock is employed in the exclusion control. In step S2507, the RM adapter restart program 203 acquires all records B in which the value of the PRS 503 in the lock management table 205 includes the GXID acquired in step S2503.

In the subsequent step S2508, the RM adapter restart program 203 moves the GXID acquired in step S2503 from the PRS 503 to the CRS 504 for all the acquired records B and proceeds to step S2509. In step S2509, the RM adapter restart program 203 acquires a record whose value of the sequence number 601 in the query management table 209 is larger than the value of the sequence number 601 of the acquired record A and is minimum as a new record A and returns to step S2502.

(Timing Chart)

As described so far, the processing system 1 can use either pessimistic lock or optimistic lock in the exclusion control of the distributed transaction processing, and the KVS 160 may have the transaction control function or does not have to have the transaction control function. In other words, a total of four patterns of combinations including two patterns of the exclusion control and two patterns of whether or not transaction control is performed, are assumed. Hereinafter, the four patterns will be referred to as patterns 1 to 4.

Specifically, the pattern 1 is a combination in which pessimistic lock is performed and transaction control is performed, the pattern 2 is a combination in which optimistic lock is performed and transaction control is performed, the pattern 3 is a combination in which pessimistic lock is performed and transaction control is not performed, and the pattern 4 is a combination in which the optimistic lock is performed and transaction control is not performed. Among the four patterns, a timing chart of the pattern 1 will be described below using FIG. 32 to FIG. 35. In each timing chart, time elapses from an upper portion in the drawing toward a lower portion in the drawing.

Figure 32:
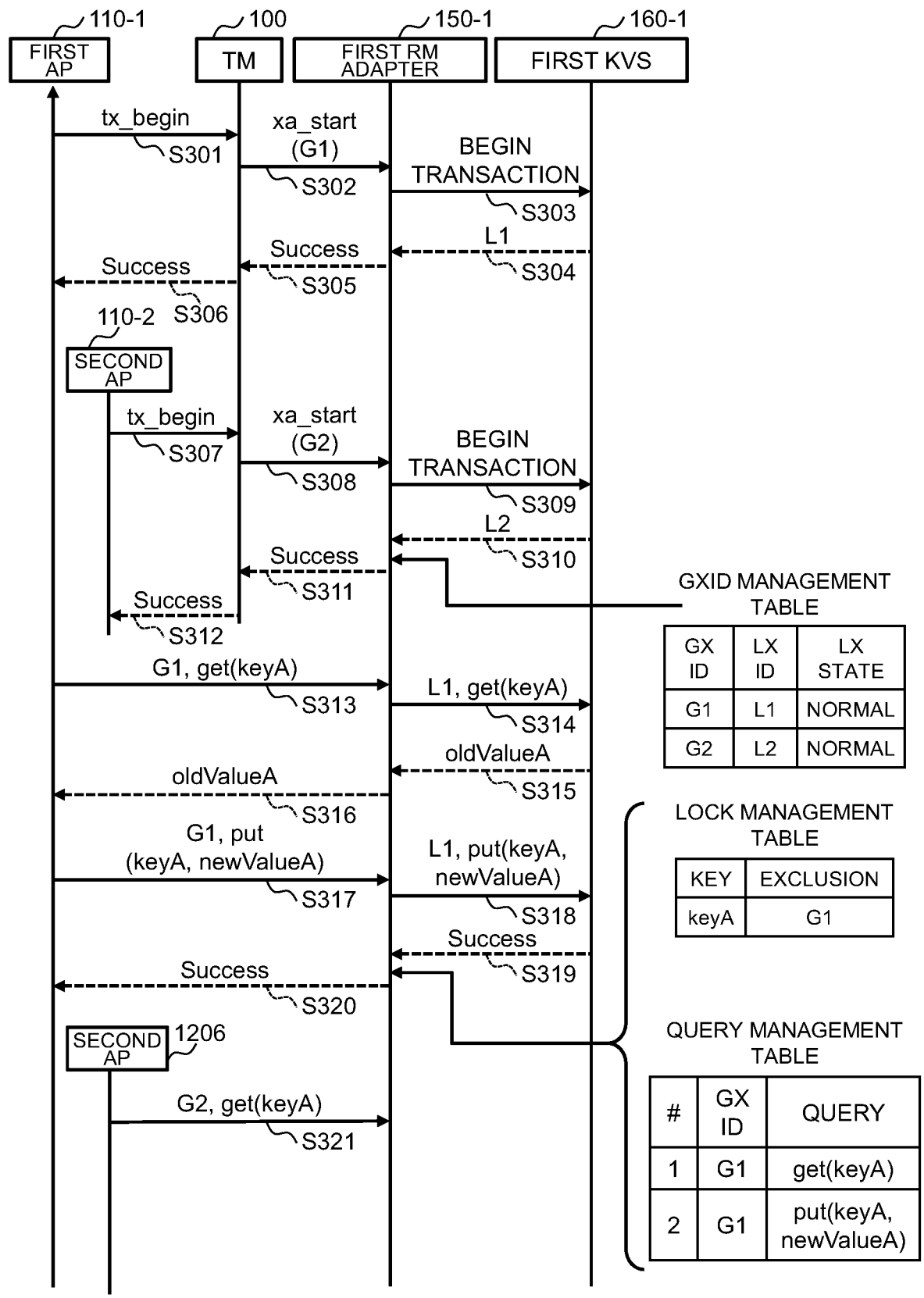
FIG. 32 is a view indicating processing when the RM adapter receives xa_start and a query in a pattern 1.
Figure 33:
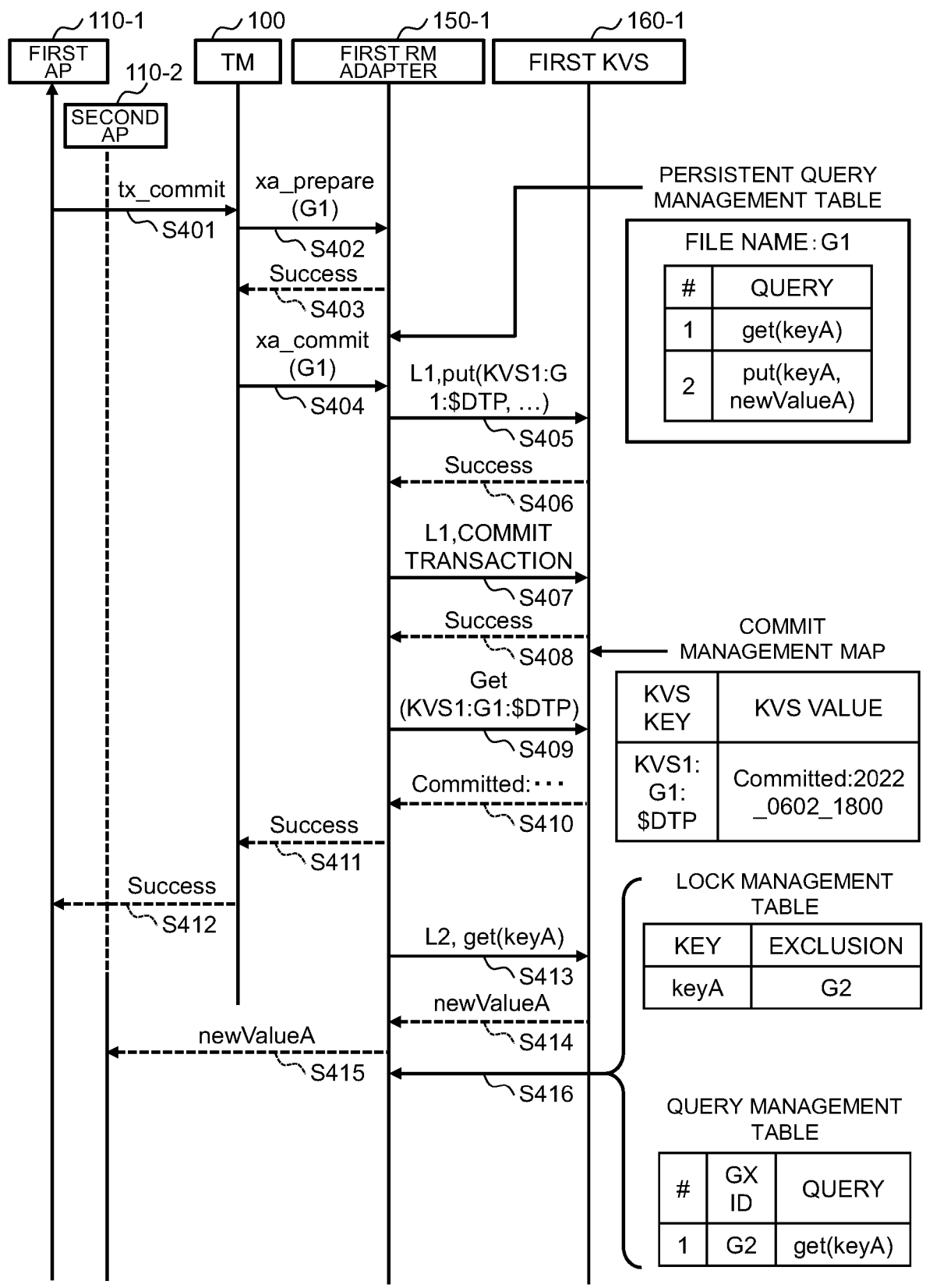
FIG. 33 is a view indicating processing when the RM adapter receives xa_prepare in the pattern 1.
Figure 34:
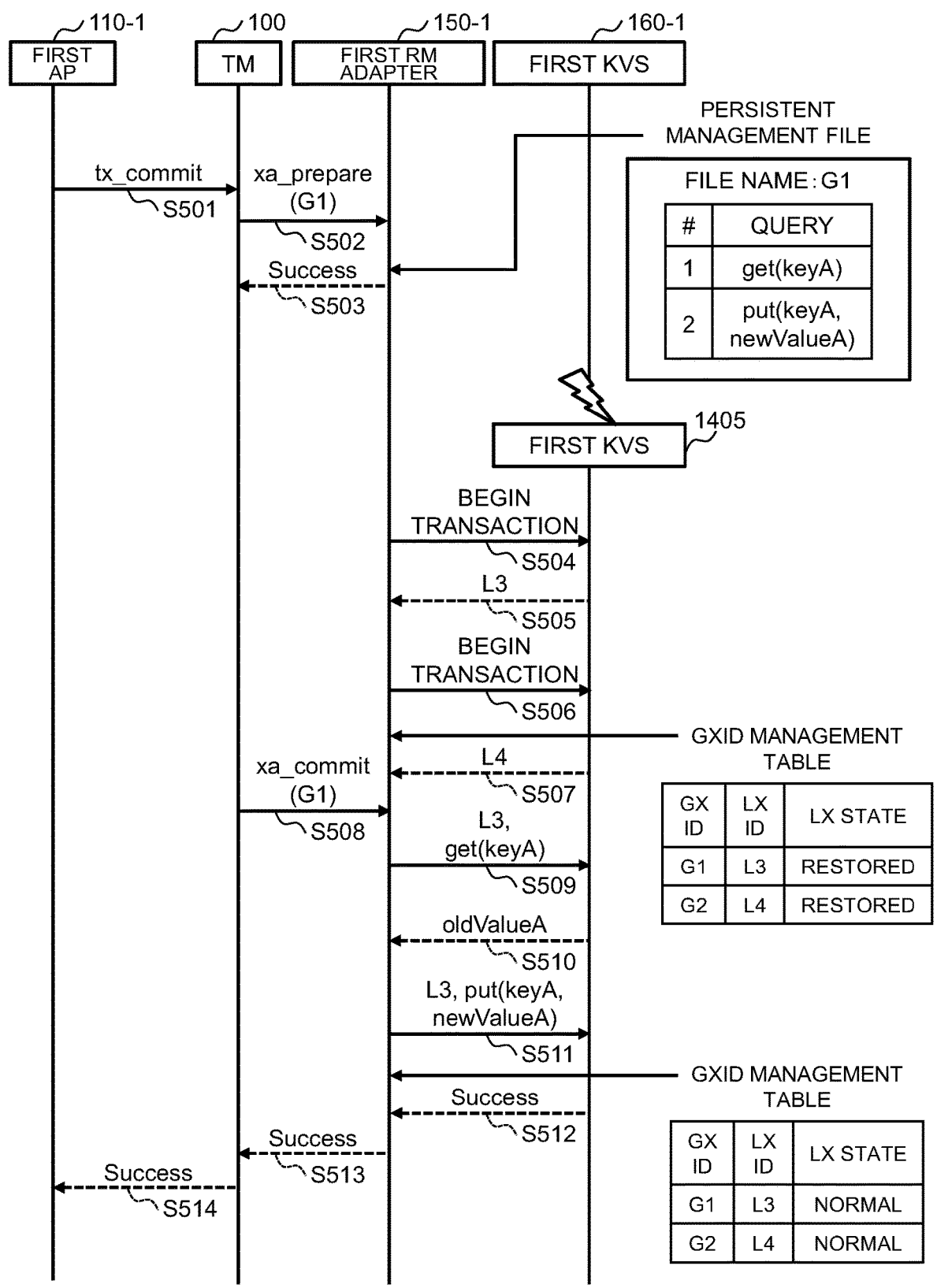
FIG. 34 is a view indicating processing when the KVS is restored from down in the pattern 1.
Figure 35:
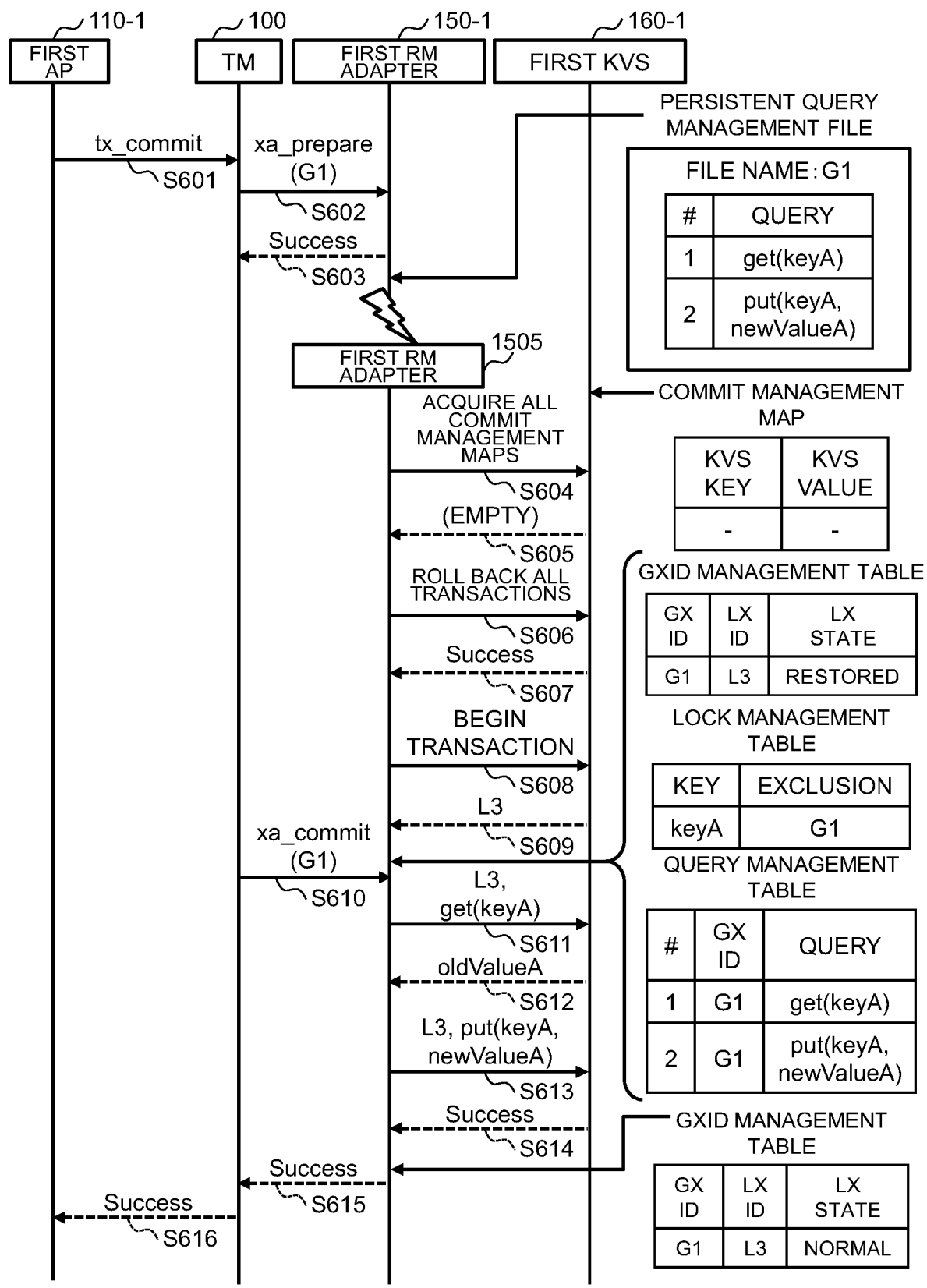
FIG. 35 is a view indicating processing when the RM adapter is restored from down in the pattern 1.

FIG. 32 to FIG. 35 are specifically as follows. FIG. 32 indicates processing when the RM adapter 150 receives xa_start and a query in the pattern 1. FIG. 33 indicates processing when the RM adapter 150 receives xa_prepare in the pattern 1. FIG. 34 indicates processing when the KVS 160 is restored from down in the pattern 1. FIG. 35 indicates processing when the RM adapter 150 is restored from down in the pattern 1. Note that in the following description, corresponding step numbers in the flowchart will be also described along with description of the timing chart. Thereafter, for the pattern 2, a difference from the pattern 1 will be described. The pattern 3 and the pattern 4 are different from the processing in the pattern 1 and the pattern 2 in selection of an option as to whether or not the transaction control function is provided as in step S705 in FIG. 12.

<1-0. Initial State of Pattern 1>

In a case where the KVS 160 has the transaction control function, a configuration of the RM adapter 150 is as illustrated in FIG. 2. In an initial state of the RM adapter 150, the GXID management table 204, the query management table 209 and the lock management table 205 are empty, and no persistent query management file 212 exists. Further, the value of the "issuance reserved sequence number" in the sequence number management file 211 is "0".

<1-1. Upon Acceptance of xa_start in Pattern 1>

The first AP 110-1 invokes tx_begin that is one of TX interfaces for the TM 100 (S301). The TM 100 that has accepted tx_begin first generates a GXID and invokes xa_start that is one of XA interfaces after attaching the generated GXID, that is, the designated GXID to the argument for all the KVSs 160 or the RM adapters 150 (S302). The GXID generated in this event is "G1", and "xa_start (G1)" having "G1" as the argument as indicated in FIG. 32 is invoked.

The RM adapter 150 that has accepted xa_start operates the TM acceptance program 206. The TM acceptance program 206 proceeds from S701 to S702 in FIG. 12 and starts distributed Tx start processing because the accepted XA interface is xa_start. The distributed Tx start processing (FIG. 14) includes the following four kinds of processing. First, the distributed Tx terminating processing for the designated GXID is invoked, and remaining data regarding the designated GXID is deleted from a memory or a storage (S901). Second, "BEGIN TRANSACTION" is transmitted to cause the first KVS 160-1 to newly start a transaction (S303, S903). Third, an ID of the transaction started by the first KVS 160-1, that is, an LXID is acquired (S304, S904). Here, the acquired LXID is "L1". Fourth, a new record is recorded in the GXID management table 204 using the GXID determined by the TM 100 and the LXID acquired from the first KVS 160-1 (S905). The first RM adapter 150-1 assigns "normal" to the value of the LX state 403 in this record. When the first RM adapter 150-1 records a new record in the GXID management table 204, the first RM adapter 150-1 transmits Success indicating normal completion to the TM 100 (S305). The TM 100 that has received Success from the first RM adapter 150-1 transmits Success indicating normal completion to the first AP 110-1 in a similar manner (S306). However, communication in S306 includes data indicating "G1" that is the generated GXID.

When the second AP 110-2 invokes tx_begin for the TM 100 in a similar manner to the first AP 110-1, processing similar to the processing from S301 to S306 is performed as S307 to S312. However, in this case, the GXID generated by the TM 100 is "G2", and the LXID transmitted by the first KVS 160-1 is "L2". The GXID management table 204 of the first RM adapter 150-1 immediately before the processing in S311 is executed is as indicated in the right middle portion of FIG. 32.

<1-2. Upon Acceptance of Query in Pattern 1>

The first AP 110-1 that has finished invoking tx_begin passes the GXID and a query that constitutes the distributed transaction processing to the first RM adapter 150-1 (S313). Here, the first AP 110-1 passes the GXID "G1" and the query "get(key A)". The first RM adapter 150-1 that has accepted the query operates the AP acceptance program 201 and performs the following seven kinds of processing. The AP acceptance program 201 performs the processing indicated in FIG. 15 to FIG. 17.

In the first processing, the record corresponding to the designated GXID is acquired from the GXID management table 204 to confirm that the transaction is the distributed transaction for which acceptance of tx_begin has been completed (S1001). In a case where there is no record, an error is returned to the AP. In the second processing, a key of data to be operated is extracted from the received query (S1003). In the third processing, whether a hash value of the extracted key is included in a range of the KVS to be handled by the RM adapter 150 is confirmed to confirm that the transaction on the KVS side can accept a query (S1004). In a case where the hash value is not included in the range, an error is returned to the AP 110.

In the fourth processing, exclusion control is executed so as to avoid concurrent execution, and processing of the following 4A to 4C is performed. (4A) The lock management table update processing is invoked (the processing in FIG. 27 is started in S1006), and the extracted key is locked (S2106). If another distributed transaction has already been locked (S2104: Yes), the processing stands by until the distributed transaction ends (S2105). (4B) A new sequence number is generated using the sequence number management file 211 (S1007). Note that in a similar manner to a typical database, the "issuance reserved sequence number" is not always perpetuated in a disk every time. A "batch issuance constant" that is an integer equal to or larger than 1 is determined, and the issuance reserved sequence number is perpetuated when the number of times of issuance of the sequence number exceeds the batch issuance constant. In a case where the RM adapter 150 is down in the middle, issuance of the sequence number is restarted from the perpetuated "issuance reserved sequence number"+the "batch issuance constant" to prevent the sequence number to be issued from overlapping with the sequence number issued before the RM adapter 150 is down.

(4C) A record is added to the query management table 209 using the designated GXID, the received query and the generated sequence number (S1008, S1010: Yes). In the fifth processing, it is confirmed that the value of the LX state 402 of the record acquired in the first processing is "normal" (S1101). If the value of the LX state 402 is "restored", the processing repeats standby for a fixed period until the value changes to "normal" (S1104). In the sixth processing, the transaction on the KVS side corresponding to the value of the LXID 402 of the record acquired in the first processing is restarted (S1102). In the seventh processing, the restarted transaction on the KVS side is caused to execute the received query and returns the execution result to the AP 110 (S1103).

<1-3. Upon Acceptance of xa_prepare in Pattern 1>

The first AP 110-1 invokes tx_commit that is one of TX interfaces for the TM 100 when the distributed transaction ends (S401). The TM 100 that has accepted tx_commit attaches the GXID "G1" as the argument and invokes xa_prepare that is one of XA interfaces for all the RM adapters 150 as a first phase (S402). The first RM adapter 150-1 that has accepted xa_prepare operates the TM acceptance program 206. The TM acceptance program 206 starts distributed Tx preparation processing because the accepted XA interface is xa_prepare (S703 in FIG. 12, FIG. 18).

The following two kinds of processing are mainly performed in the distributed Tx preparation processing. First, a record corresponding to the designated GXID is acquired from the GXID management table 204 to confirm that the transaction is the distributed transaction for which acceptance of tx_begin has been completed (S1301, S1302 and S1303: Yes, and proceed to FIG. 19). The TM acceptance program 206 returns an error to the AP in a case where the record corresponding to the GXID management table 204 is not stored (S1302: No, end with error).

In the distributed Tx preparation processing, second, a record list corresponding to the designated GXID is acquired from the query management table 209 (S1307), and content thereof is recorded in a storage as the persistent query management file 212 (S1311). Then, the first RM adapter 150-1 transmits Success indicating success of the processing to the TM 100 (S403). In the example indicated in FIG. 33, as indicated in an upper right portion, the persistent query management file 212 having a file name of the GXID of "G1" is generated. Two records with the GXID of "G1" that are described in the query management table 209 are described.

<1-4. Upon Acceptance of xa_commit in Pattern 1>

The TM 100 after xa_prepare is invoked for all the RM adapters 150 attaches the GXID as the argument and invokes xa_commit that is one of XA interfaces for all the RM adapters 150 as a second phase (S404). The first RM adapter 150-1 that has accepted xa_commit operates the TM acceptance program 206. The TM acceptance program 206 starts distributed Tx settlement first processing because the accepted XA interface is xa_commit (S705 in FIG. 12: Yes, S707: FIG. 20). In the distributed Tx settlement first processing, the following six kinds of processing, that is, first processing to sixth processing are performed.

In the first processing, the TM acceptance program 206 acquires a record A corresponding to the designated GXID with reference to the GXID management table 204 (S1401). Note that a circumstance where the corresponding record cannot be acquired is not assumed because it has been confirmed that the corresponding record A exists at a time point of xa_prepare. In the second processing, the TM acceptance program 206 confirms that the value of the LX state 403 of the record A acquired in the immediately preceding processing is "normal" (S1402). In a case where the value of the LX state 403 of the record A is "restored", the TM acceptance program 206 repeats standby for a fixed period until the value changes to "normal" (S1407).

In the third processing, the TM acceptance program 206 restarts the transaction on the KVS 160 side corresponding to the value of the LXID 402 of the record A, that is, the transaction at the first KVS 160-1 (S1403). In the fourth processing, the TM acceptance program 206 creates a query (GXID query) for registering data corresponding to the designated GXID in the commit management map 221 on the KVS and causes the restarted transaction on the KVS 160 side to execute the query (S405, S1404). If the commit is completed, the first KVS 160-1 notifies the first RM adapter 150-1 that the processing has been successful (S406).

In the fifth processing, the TM acceptance program 206 commits the restarted transaction on the KVS 160 side (S407, S1405). If the commit is completed, the first KVS 160-1 notifies the first RM adapter 150-1 that the processing has been successful (S408). In the sixth processing, the TM acceptance program 206 causes the first KVS 160-1 to execute a query for acquiring the data registered in the fourth processing from the commit management map 221 on the first KVS 160-1 (S1406). Further, the TM acceptance program 206 confirms that data can be obtained from the execution result (S409, S410, S1408). In a case where data cannot be obtained, the TM acceptance program 206 returns to and redoes the first processing (S1409, S1402).

The RM adapter 150 causes the Tx end detection program 202 to be resident in addition to the TM acceptance program 206 and the AP acceptance program 201. Operation of the Tx end detection program 202 is as described with reference to FIG. 22.

<1-5. When KVS is Down and Restored in Pattern 1>

If the KVS 160 is restored from down, in the RM adapter 150, the first the KVS restart program 208 operates. The KVS restart program 208 (FIG. 24) executes the following processing. First, the KVS restart program 208 overwrites the values of the LX states 403 of all the records in the GXID management table 204 with "restored" (S1801). Second, the KVS restart program 208 newly starts a transaction on the KVS 160 side for each record in the GXID management table 204 (S504, S506) and overwrites the LXID thereof (S1802). In the example indicated in FIG. 34, two records exist in the GXID management table 204, and thus, a total of two transactions in S504 and S506 are started.

Third, the KVS restart program 208 sorts the values of the sequence numbers 601 of all record lists in the query management table 209 in ascending order and sequentially repeats processing of the following 3A and 3B from the head record. (3A) A record corresponding to the value of the GXID 602 of a processing target record is acquired from the GXID management table 204, and a transaction on the KVS 160 side corresponding to the value of the LXID 402 of the acquired record is restarted (S1805). (3B) The restarted transaction on the KVS 160 side is caused to execute the value of the query 603 of the processing target record (S1806). Fourth, the KVS restart program 208 overwrites the values of the LX states 403 of all the records in the GXID management table 204 with "normal" (S1808).

<1-6. When RM Adapter is Down and Restored in Pattern 1>

In a case where the RM adapter 150 is down and restored, the RM adapter 150 first executes the RM adapter restart program 203. The RM adapter restart program 203 (FIG. 25) executes the following first processing to fifth processing. In the first processing, all records A are acquired from the commit management map 221 on the KVS 160 (S604, S1901). In the second processing, the GXID is extracted from the KVS keys 801 of all the records A, and the persistent query management file 212 having the same file name as the extracted GXID is deleted (S1903).

In the third processing, exclusion control is executed to avoid concurrent execution (S1904), and the following processing of 3A and 3B is performed. (3A) All the persistent query management files 212 remaining in the external storage apparatus 153 of the RM adapter 150 are read, and the GXID management table 204 and the query management table 209 are generated on the basis of content of the remaining persistent query management files 212 (S1905). (3B) The lock management table reproduction processing (S1906, S1913) is invoked, and the lock management table 205 is reproduced using the query management table 209. In the fourth processing, all the transactions on the KVS 160 side are rolled back (S606, S1908). In the fifth processing, the KVS restart program 208 is executed (S1913).

Next, the pattern 2 will be described focusing on differences from the pattern 1.

<2-2. Upon Acceptance of Query in Pattern 2>

The pattern 2 is different from the pattern 1 in behavior when the lock management table update processing indicated in FIG. 27 to FIG. 29 is invoked in (4A) of the fourth processing. While in the pattern 1, the processing stands by in the present processing in a case where the key cannot be locked, the processing proceeds as is without standby in pessimistic lock in the pattern 2.

<2-3. Upon Acceptance of xa_prepare in Pattern 2>

Processing of invoking the lock management table verification processing indicated in FIG. 30 is inserted between the first processing and the second processing. Here, in a case where verification has failed (dirty read has occurred), after distributed Tx terminating processing is invoked to delete data regarding the designated GXID, an error is returned to the TM 100. Further, in a case where verification has been successful, that is, dirty read has not occurred, the processing proceeds to the second processing.

Note that in a case where with respect to data to be updated by the AP 110, another distributed transaction that refers to the data before update is in an in-doubt state, that is, in a case where one or more elements are in the CRS 504 of the record corresponding to the data to be updated in the lock management table 205, the following processing is performed. In other words, the processing stands by in the present processing until the in-doubt state of the distributed transaction is resolved, that is, the CRS 504 becomes an empty set.

<2-4. Upon Acceptance of xa_commit in Pattern 2>

The Tx end detection program 202 is rewritten as follows. In a case where data can be obtained, the commit has been successful, and thus, the distributed Tx terminating processing for the GXID acquired in the fourth processing is invoked. In this event, the GXID acquired in the fourth processing is deleted from the CRSs 504 of all records in the lock management table 205, and distributed Tx preparation processing of another distributed transaction that stands by for the CRSs 504 to become an empty set is restarted. After the distributed Tx terminating processing ends, the processing returns to the first processing.

According to the above-described first embodiment, the following effects can be obtained.

(1) In Pattern 1 and Pattern 2, KVS 160, which is a data store, has a transaction-control function. KVS 160 includes a commit management map 221, which is an area for storing GXID that are identifiers of distributed transactions. In Pattern 1 and Pattern 2, RM adapter 150, which is an adapter connected to KVS 160 that does not have the distributed transaction control function, performs the following control methods. The control methods executed by RM adaptor 150 include the following alternate processing, perpetuation processing, distributed Tx determination first processing, and store restart processing. The alternate process is a process in which, when RM adaptor 150 receives a reception query that is a query from AP 110, the data targeted by the reception query is locked (S1006 in FIG. 15), the reception query is temporarily stored (S1008 in FIG. 15), and the transaction on the data store is caused to execute the reception query (S1103 in FIG. 16). The perpetuation process is a process in which, when RM adaptor 150 receives a prepare command from a TM100 that manages distributed transaction control among a plurality of data stores, it determines whether or not it can be committed using the lock management table 205, and if it can be committed (S1305: Yes or S1303:Yes in FIG. 18), it persists GXID to commit and the temporarily stored received queries (FIG. 19). The distributed Tx determination first process (FIG. 20) is a process in which, when RM adaptor 150 receives commit instruction from the transaction manager, GXID addition query, which is a query to add GXID to be committed to the commit management map 221, is executed by the transaction on the data store side (S1404), and the transaction on the data store side is committed (S1405). The store restart process (FIG. 24) is a process in which, when KVS 160 recovers from the downtime, RM adaptor 150 refers to the commit management map 221 stored in the restored KVS 160, starts a new transaction in the data store for the distributed transaction in the in-doubt state, reproduces the persistent query, and commits the distributed transaction that should have committed but remains in-doubt state. Therefore, it is possible to start servicing at an early stage when KVS 160, which is a data store, returns from being down.

(2) The control methodology performed by RM adapter 150 (S1903~S1909 of FIG. 25) includes a RM adapter restart process that, when RM adapter 150 recovers from down, rolls back all transactions on KVS 160 and causes a new transaction on the datastore to execute a query using the persistent query management data and commit management map 221, which is a collection of S1908 of information used for commit GXID, initial data, simulated queries, and transaction control. Therefore, when RM adaptor 150 returns from the down state, servicing can be started at an early stage.

(3) In Pattern 3 and Pattern 4, KVS 160 that is the data store does not have a transaction-control function. RM adaptor 150 in the pattern 3 and the pattern 4 executes the following control methods. The control methods executed by RM adaptor 150 include the following alternate processing, perpetuation processing, distributed Tx determination second processing, and store restart processing. The alternate process is a process in which, when RM adaptor 150 receives a reception query that is a query from AP 110, the reception query locks the target data (S1006 in FIG. 15), acquires the initial data targeted by the reception query from KVS 160 (S1203 in FIG. 17), simulates the execution of the query using the initial data or the intermediate data instead of the data store (S1205), and holds the result of the simulation as the intermediate data (S1206). The perpetuation process is a process in which, when RM adaptor 150 receives a prepare instruction from a transaction manager that manages distributed transaction control among a plurality of data stores, it determines whether or not it can be committed by using lock information, and if it can be committed, it persists GXID, the initial data, and the simulated query. The distributed Tx determination second process (FIG. 21) is a process in which, when RM adaptor 150 receives a commit command from the transaction manager, the data store is caused to execute a series of queries in which a query to be updated to the initial data, a received query, and a GXID addition query that is a query to add GXID to the commit management map 221 are concatenated. The store restart process refers to the commit management map 221 of the datastore when the datastore recovers from a down state, and commits a distributed transaction that should have committed but remains in-doubt. Therefore, it is possible to start servicing at an early stage when KVS 160, which is a data store, returns from being down.

(4) The control performed by RM adaptor 150 (S1910~S1914 in FIG. 25) includes a RM adaptor restart process that, when the adaptor recovers from downtime, plays locks for distributed transactions in the in-doubt status using the commit management map 221 of the data store and the information that has been persisted in KVS 160.

Modification 1

In the embodiment described above, each RM adapter 150 includes both a RM adapter restart program 203 and a KVS restart program 208. However, each RM adapter 150 may include at least one of RM adapter restart program 203 and KVS restart program 208. RM adaptor 150 and KVS 160 correspond to both the pessimistic lock and the optimistic lock, but may correspond to at least one of the pessimistic lock and the optimistic lock.

In the above-described embodiments and modifications, the configuration of the functional blocks is merely an example. Several functional configurations shown as separate functional blocks may be integrally configured, or a configuration represented by one functional block diagram may be divided into two or more functions. In addition, some of the functions of the functional blocks may be included in other functional blocks.

In the above-described embodiments and modifications, the program executed by RM adaptor 150 is stored in the external storage apparatus 153 in advance, but RM adaptor 150 may include an input/output interface (not shown), and the program may be read from another device via a medium in which the input/output interface is available when needed. Here, the medium refers to, for example, a storage medium that is detachable from the input/output interface, or a communication medium, that is, a network such as a wire, wireless, or optical network, or a carrier wave or a digital signal that propagates through the network. In addition, some or all of the functions realized by the programs may be realized by hardware circuitry or FPGA.

The above-described embodiments and modifications may be combined with each other. While various embodiments and modifications have been described above, the present invention is not limited thereto. Other aspects contemplated within the spirit of the invention are also within the scope of the invention.

The invention claimed is:

1. A control method implemented by an adapter for a data store, the method comprising:
  receiving a query from an application program and locking data targeted by the query;
  temporarily storing the query and executing the query on the data store;
  upon receiving a prepare command from a transaction manager for a distributed transaction, determining whether a commit is possible using lock information, and persistently storing, in a transaction-state storage area, a global transaction identifier (GXID) for the distributed transaction together with the temporarily stored query when the commit is possible;
  upon receiving a commit command from the transaction manager, executing a commit operation by adding the GXID to a commit management map of the data store and committing the distributed transaction on the data store; and
  in response to a restart of the data store, initiating a recovery transaction that re-executes the temporarily stored query associated with any GXID that is absent from the commit management map and committing each re-executed query, thereby completing each in-doubt transaction.

2. The control method according to claim 1, wherein a pessimistic lock is used in lock control at the adapter.

3. The control method according to claim 1, wherein an optimistic lock is used in lock control at the adapter.

4. The control method of claim 1, further comprising:
  simulating the execution of the received query using initial or intermediate data when the data store lacks transaction control functionality; and
  updating the commit management map with a result of the simulation.

5. The control method of claim 1, wherein the adapter utilizes an optimistic lock or a pessimistic lock for exclusion control, based on a configuration of the data store.

6. The control method of claim 1, further comprising:
  managing transaction states by maintaining a GXID management table comprising fields for a global transaction identifier (GXID), a local transaction identifier (LXID), and a transaction state.

7. The control method of claim 1, further comprising:
maintaining a query management table that associates each query with a sequence number and a corresponding transaction identifier for efficient execution and recovery.

8. The control method of claim 1, wherein the adapter:
identifies and deletes stale records from the commit management map during a cleaning process; and
ensures durability of committed transactions even during failure recovery.

9. A non-transitory computer readable storage medium storing instructions which, when executed by a processor, cause the processor to perform a method comprising:
receiving a query from an application program and locking data targeted by the query;
temporarily storing the query and executing the query on a data store;
upon receiving a prepare command from a transaction manager for a distributed transaction, determining whether a commit is possible using lock information, and persistently storing, in a transaction-state storage area, a global transaction identifier (GXID) for the distributed transaction together with the temporarily stored query when the commit is possible;
upon receiving a commit command from the transaction manager, executing a commit operation by adding the GXID to a commit management map of the data store and committing the distributed transaction on the data store; and
in response to a restart of the data store, initiating a recovery transaction that re-executes the temporarily stored query associated with any GXID that is absent from the commit management map and committing each re-executed query, thereby completing each in-doubt transaction.

10. The non-transitory computer readable storage medium according to claim 9, wherein the method is executed by an adapter and a pessimistic lock is used in lock control at the adapter.

11. The non-transitory computer readable storage medium according to claim 9, wherein the method is executed by an adapter and an optimistic lock is used in lock control at the adapter.

12. A system for controlling a data store, the system comprising:
a communication interface communicatively coupled to the data store;
a memory; and
a processor communicatively coupled to the communication interface and the memory, wherein the processor is configured to:
receive a query from an application program and lock data targeted by the query,
temporarily store the query and execute the query on the data store,
upon receiving a prepare command from a transaction manager for a distributed transaction, determine whether a commit is possible using lock information, and persistently store, in a transaction-state storage area, a global transaction identifier (GXID) for the distributed transaction together with the temporarily stored query when the commit is possible,
upon receiving a commit command from the transaction manager, execute a commit operation by adding the GXID to a commit management map of the data store and committing the distributed transaction on the data store, and
in response to a restart of the data store, initiate a recovery transaction that re-executes the temporarily stored query associated with any GXID that is absent from the commit management map and commit each re-executed query, thereby completing each in-doubt transaction.

* * * * *